United States Patent
Oh et al.

(10) Patent No.: US 11,054,674 B2
(45) Date of Patent: Jul. 6, 2021

(54) PN-JUNCTION PHASE MODULATOR IN A LARGE SILICON WAVEGUIDE PLATFORM

(71) Applicant: ROCKLEY PHOTONICS LIMITED, London (GB)

(72) Inventors: Dong Yoon Oh, Alhambra, CA (US); David Arlo Nelson, Fort Collins, CO (US); Pradeep Srinivasan, Fremont, CA (US); Amit Singh Nagra, Altadena, CA (US); Aaron John Zilkie, Pasadena, CA (US); Jeffrey Driscoll, San Jose, CA (US); Aaron L. Birkbeck, San Diego, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/393,889

(22) Filed: Apr. 24, 2019

(65) Prior Publication Data
US 2020/0133091 A1    Apr. 30, 2020

Related U.S. Application Data

(60) Provisional application No. 62/750,226, filed on Oct. 24, 2018.

(51) Int. Cl.
*G02F 1/025* (2006.01)
*G02B 6/134* (2006.01)
(Continued)

(52) U.S. Cl.
CPC ........... *G02F 1/025* (2013.01); *G02B 6/1347* (2013.01); *G02F 1/2257* (2013.01);
(Continued)

(58) Field of Classification Search
CPC ... G02F 1/011; G02F 2001/0151–0154; G02F 2203/50; G02B 2006/12061; G02B 2006/12097; G02B 2006/12142
(Continued)

(56) References Cited

U.S. PATENT DOCUMENTS 9,343,638 B2    5/2016 Gardes et al.
9,360,688 B2 *  6/2016 Patel ................. G02F 1/2257
(Continued)

FOREIGN PATENT DOCUMENTS

EP    3 264 166 A1    1/2018

OTHER PUBLICATIONS

"80-GB/s Low-Driving-Voltage InP DQPSK Modulator With an n—p—i—n Structure" by Kikuchi et al, IEEE Photonics Technology Letters, vol. 21, No. 12, Jun. 15, pp. 787-789, 2009.*
(Continued)

*Primary Examiner* — Robert Tavlykaev
(74) *Attorney, Agent, or Firm* — Lewis Roca Rothgerber Christie LLP

(57) ABSTRACT

A modulator. In some embodiments, the modulator includes a portion of an optical waveguide, the waveguide including a rib extending upwards from a surrounding slab. The rib may have a first sidewall, and a second sidewall parallel to the first sidewall. The rib may include a first region of a first conductivity type, and a second region of a second conductivity type different from the first conductivity type. The second region may have a first portion parallel to and extending to the first sidewall, and a second portion parallel to the second sidewall. The first region may extend between the first portion of the second region and the second portion of the second region.

12 Claims, 28 Drawing Sheets

(51) Int. Cl.
*G02F 1/225* (2006.01)
*G02B 6/12* (2006.01)

(52) U.S. Cl.
CPC .............. *G02B 2006/12061* (2013.01); *G02B 2006/12097* (2013.01); *G02B 2006/12142* (2013.01); *G02F 1/225* (2013.01); *G02F 2201/063* (2013.01); *G02F 2203/50* (2013.01)

(58) Field of Classification Search
USPC ........................................................ 385/1–3
See application file for complete search history.

(56) References Cited

U.S. PATENT DOCUMENTS

| | | | |
|---|---|---|---|
| 9,638,942 B2 | 5/2017 | Baehr-Jones et al. | |
| 10,151,941 B2* | 12/2018 | Ishikura .................. | G02F 1/025 |
| 2004/0160658 A1* | 8/2004 | Liu .......................... | G02F 1/025 359/279 |
| 2010/0060970 A1* | 3/2010 | Chen ....................... | G02F 1/025 359/245 |
| 2010/0080504 A1* | 4/2010 | Shetrit ................... | G02F 1/2257 385/14 |
| 2010/0296769 A1* | 11/2010 | Ishibashi ................. | G02F 1/025 385/2 |
| 2011/0058764 A1 | 3/2011 | Kim et al. | |
| 2011/0176762 A1 | 7/2011 | Fujikata et al. | |
| 2011/0206313 A1* | 8/2011 | Dong ....................... | G02F 1/025 385/2 |
| 2012/0257850 A1* | 10/2012 | Fujikata ................. | G02F 1/025 385/3 |
| 2014/0177994 A1* | 6/2014 | Chen ....................... | H01L 33/58 385/2 |
| 2015/0338687 A1 | 11/2015 | Manouvrier | |
| 2017/0102563 A1* | 4/2017 | Luo ......................... | G02F 1/025 |
| 2020/0075094 A1* | 3/2020 | Kim ........................ | G11C 8/16 |

OTHER PUBLICATIONS

"P—N—I—P and N—P—I—N Junction Transistor Triodes" by Early, The Bell System Technical Journal, vol. XXXIII, pp. 517-533, 1954.*
Gardes, F.Y. et al., "40 Gb/s silicon photonics modulator for TE and TM polarisations", Optics Express, Jun. 6, 2011, pp. 11804-11814, vol. 19, No. 12, Optical Society of America.
Liu, Yang et al., "Ultra-Responsive Phase Shifters for Depletion Mode Silicon Modulators", Journal of Lightwave Technology, Dec. 1, 2013, pp. 3787-3793, vol. 31, No. 23, IEEE.
Yong, Zheng et al., "U-shaped PN junctions for efficient silicon Mach-Zehnder and microring modulators in the O-band", Optics Express, Apr. 3, 2017, pp. 8425-8439, vol. 25, No. 7, Optical Society of America.
International Search Report and Written Opinion of the International Searching Authority, dated Jan. 17, 2020, Corresponding to PCT/EP2019/079090, 12 pages.

* cited by examiner

| Waveguide height (H) | Waveguide width (W) | Aspect ratio (H/W) | Waveguide width (W) | Aspect ratio (H/W) | Phase shift contribution from the vertical PN interfaces |
|---|---|---|---|---|---|
| 3 um | 0.6 - 1.0 um | 3 - 5 | 0.65 - 0.9 um | 3.3 - 4.6 | 96.3 - 98.4 % |
| 1.8 um | 0.5 - 1.0 um | 1.8 - 3.6 | | | |
| 1.0 um | 0.5 - 0.7 um | 1.4 - 2 | | | |

*FIG. 2*

PN-JUNCTION PHASE MODULATOR IN A LARGE SILICON WAVEGUIDE PLATFORM

CROSS-REFERENCE TO RELATED APPLICATION(S)

The present application claims priority to and the benefit of U.S. Provisional Application No. 62/750,226, filed Oct. 24, 2018, entitled "PN-JUNCTION PHASE MODULATOR IN A LARGE SILICON WAVEGUIDE PLATFORM", the entire content of which is incorporated herein by reference.

FIELD

One or more aspects of embodiments according to the present disclosure relate to modulators, and more particularly to a PN-junction phase modulator in a large silicon waveguide platform.

BACKGROUND

A large silicon waveguide may have significant advantages over, e.g., a submicron silicon waveguide in terms of fabrication insensitivity and polarization independence. In a free-carrier-based phase modulator, however, the bandwidth of the device may scale approximately as the inverse of the volume of the active section of the waveguide. Because of this, achieving GHz-rate phase modulation may be challenging in a large waveguide platform.

An important limitation on the speed of the modulator may be due to its capacitance. It may therefore be advantageous for the modulator to achieve a given phase shift in a short device length. Moreover, the fabrication of a pn-junction in a large silicon waveguide platform may be challenging due to the limited ion implantation depth of ion implantation processes.

Thus, there is a need for an improved phase modulator in a large silicon waveguide platform.

SUMMARY

According to some embodiments of the present invention, there is provided a modulator, including: a portion of an optical waveguide, the optical waveguide including a rib extending upwards from a surrounding slab; the rib having a first sidewall, and a second sidewall parallel to the first sidewall; the rib including a first region of a first conductivity type, a second region of a second conductivity type different from the first conductivity type, and a third region of the first conductivity type; the second region having: a first portion parallel to and extending to the first sidewall, and a second portion parallel to the second sidewall, the third region being parallel to and extending to the second sidewall; the first region extending between the first portion of the second region and the second portion of the second region; and the second portion of the second region being between the first region and the third region.

In some embodiments, the ratio of the height of the rib to the width of the rib is greater than 2 and less than 6.

In some embodiments, the first region has a keyhole shape including a rounded upper portion having a width exceeding, by at least 5%, a width of a narrower lower portion.

In some embodiments, an interface between the first region and the second region includes two parallel vertical portions, the modulator being configured to impose a phase shift on light propagating through it, in response to a reverse-bias voltage applied being applied across the first region and the second region, at least 90% of the phase shift being due to interaction of the light with the two parallel vertical portions.

In some embodiments, the modulator further includes: a first metal contact, and a second metal contact, the first metal contact being connected to the first region through a conductive path traversing, in a direction from the first metal contact to the first region: first, a heavily doped region of the first conductivity type, and second, a doped region of the first conductivity type, with a doping level between that of the heavily doped region of the first conductivity type and that of the first region; and the second metal contact being connected to the second region through a conductive path traversing, in a direction from the second metal contact to the second region: first, a heavily doped region of the second conductivity type, and second, a doped region of the second conductivity type, with a doping level between that of the heavily doped region of the second conductivity type and that of the second region.

In some embodiments, the first conductivity type is p-type and the second conductivity type is n-type.

In some embodiments, the rib has a height of at least 1.8 microns and less than 4 microns and a width of at least 0.5 microns and less than 1.5 microns.

In some embodiments, the rib is composed of crystalline silicon or of crystalline silicon germanium.

According to some embodiments of the present invention, there is provided a method for fabricating a modulator on a semiconductor wafer, the method including: performing a first ion implantation operation on a rib, the rib extending upwards from an upper surface of the semiconductor wafer and having a first sidewall, and a second sidewall parallel to the first sidewall; and performing a second ion implantation operation on the rib, wherein: the implantation angle of the first ion implantation operation is greater than 45 degrees, the implantation angle of the second ion implantation operation is greater than 45 degrees, and the azimuth of the direction of the first ion implantation operation differs from the azimuth of the direction of the second ion implantation operation by between 150 and 210 degrees.

In some embodiments, the method further includes: performing a third ion implantation operation on the rib, and performing a fourth ion implantation operation on the rib, wherein: the implantation angle of the third ion implantation operation is greater than 45 degrees, the implantation angle of the fourth ion implantation operation is greater than 45 degrees, and the azimuth of the direction of the first ion implantation operation differs from the azimuth of the direction of the second ion implantation operation by between 150 and 210 degrees.

In some embodiments: both the first and second ion implantation operations are performed before the third ion implantation operation and before the fourth ion implantation operation, the first and second ion implantation operations implant dopants of a first conductivity type, and the third and fourth ion implantation operations implant dopants of a second conductivity type, different from the first conductivity type.

In some embodiments, the first conductivity type is p-type and the second conductivity type is n-type.

In some embodiments, the method further includes forming a barrier, before performing the third ion implantation operation and before performing the fourth ion implantation operation, the barrier being configured to at least partially shade at least a lower portion of a sidewall of the rib from ions during the third ion implantation operation.

In some embodiments, the fourth ion implantation operation is performed before the third ion implantation operation.

In some embodiments, the barrier is a layer of photoresist, separated from the rib by a gap.

In some embodiments, the thickness of the layer of photoresist is greater than 0.6 times the height of the rib, and less than 2.5 times the height of the rib.

In some embodiments, the width of the gap is greater than 0.4 times the thickness of the layer of photoresist and less than 1.2 times the thickness of the layer of photoresist.

In some embodiments, the method further includes performing a fifth ion implantation operation on the rib, wherein: the first, second, and fifth ion implantation operations implant dopants of a first conductivity type, and the fifth ion implantation operation is performed at a lower implantation energy than the first ion implantation operation.

BRIEF DESCRIPTION OF THE DRAWINGS

These and other features and advantages of the present disclosure will be appreciated and understood with reference to the specification, claims, and appended drawings wherein:

FIG. 2 is a table of modulator parameters, according to some embodiments of the present disclosure;

Figure 1A:
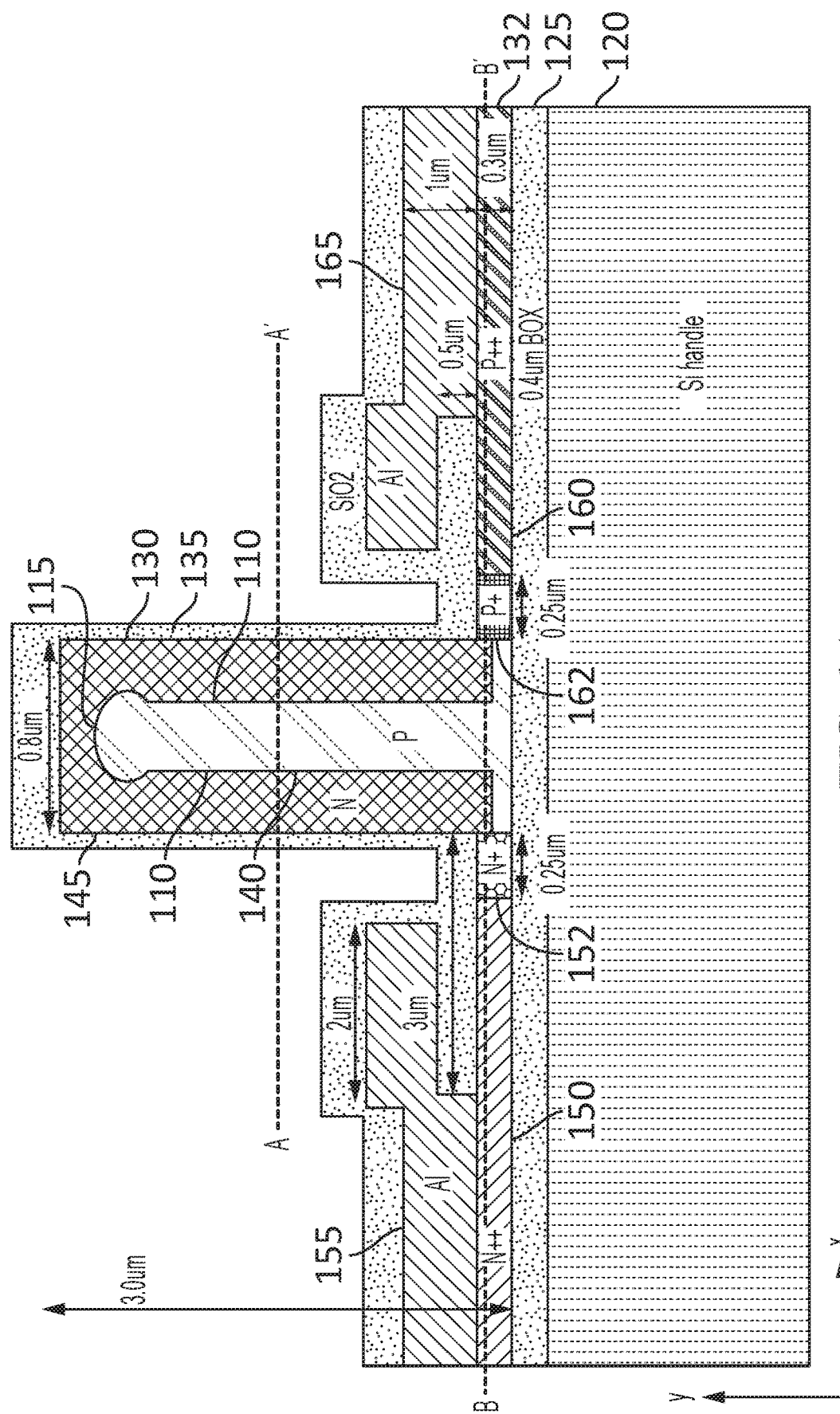
FIG. 1A is a schematic cross-sectional view of a modulator, according to an embodiment of the present disclosure.

In the drawings, each of the density diagrams and graphs is drawn to scale, for a respective embodiment. The remaining drawings are not drawn to scale.

DETAILED DESCRIPTION

The detailed description set forth below in connection with the appended drawings is intended as a description of exemplary embodiments of a pn-junction phase modulator in a large silicon waveguide platform provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

FIG. 1A shows a pn-junction modulator, in some embodiments. In FIG. 1A, the pn-junction has a keyhole shape, where the majority of the junction consists of the two vertical p-n interfaces 110 parallel to the waveguide sidewall. The two vertical p-n interfaces 110 are connected at the top by a round p-n interface 115. The rounded upper portion (defined by the round p-n interface 115) of the keyhole shape may have a width exceeding (e.g., by at least 5%) the width of the narrower, straight, lower portion defined by the two vertical p-n interfaces 110. The shape of the round part of the pn-junction at the waveguide top (i.e., of the round p-n interface 115) may vary with the waveguide width, and may become more semicircular at narrow waveguide widths (e.g., for a width of 600 nm, for a 3 micron-tall (3 um-tall) waveguide, or for a waveguide having a height between 1 micron and 3 microns)(see FIG. 1D, for example). Dimensions of some of the features are shown in FIG. 1A, for one embodiment.

The pn-junction modulator may be fabricated using a silicon on insulator (SOI) wafer, having a silicon substrate, or "silicon handle" 120, a buried oxide (BOX) layer 125, and an upper silicon layer, on the BOX layer 125. During fabrication of the pn-junction modulator, various etching steps and other processing steps (e.g., deposition steps and ion implantation steps, as discussed in further detail below) may be performed that may alter the shape and/or the composition of the upper silicon layer. The waveguide may include a rib 130 of crystalline silicon extending upwards from a surrounding slab 132. A layer of silicon dioxide 135 may cover the rib 130. The crystalline silicon of the rib 130 may have an index of refraction, within the wavelength range of interest (e.g., in the range between 1500 and 1600 nm), that is significantly greater than that of the layer of silicon dioxide 135 (and than that of the air, or other material, that may be present on the other side of the layer of silicon dioxide 135), so that the eigenmodes of the waveguide may be nearly fully confined to the rib 130, with only a small fraction of the optical power being in evanescent waves outside of the rib 130 or in the slab 132. The rib 130 may include a central doped region 140 of a first conductivity type (e.g., a p-doped region) and a surrounding region 145 of a second conductivity type (e.g., an n-doped region), the interface surface between which forms the vertical p-n interfaces 110 and the round p-n interface 115.

Figure 1B:
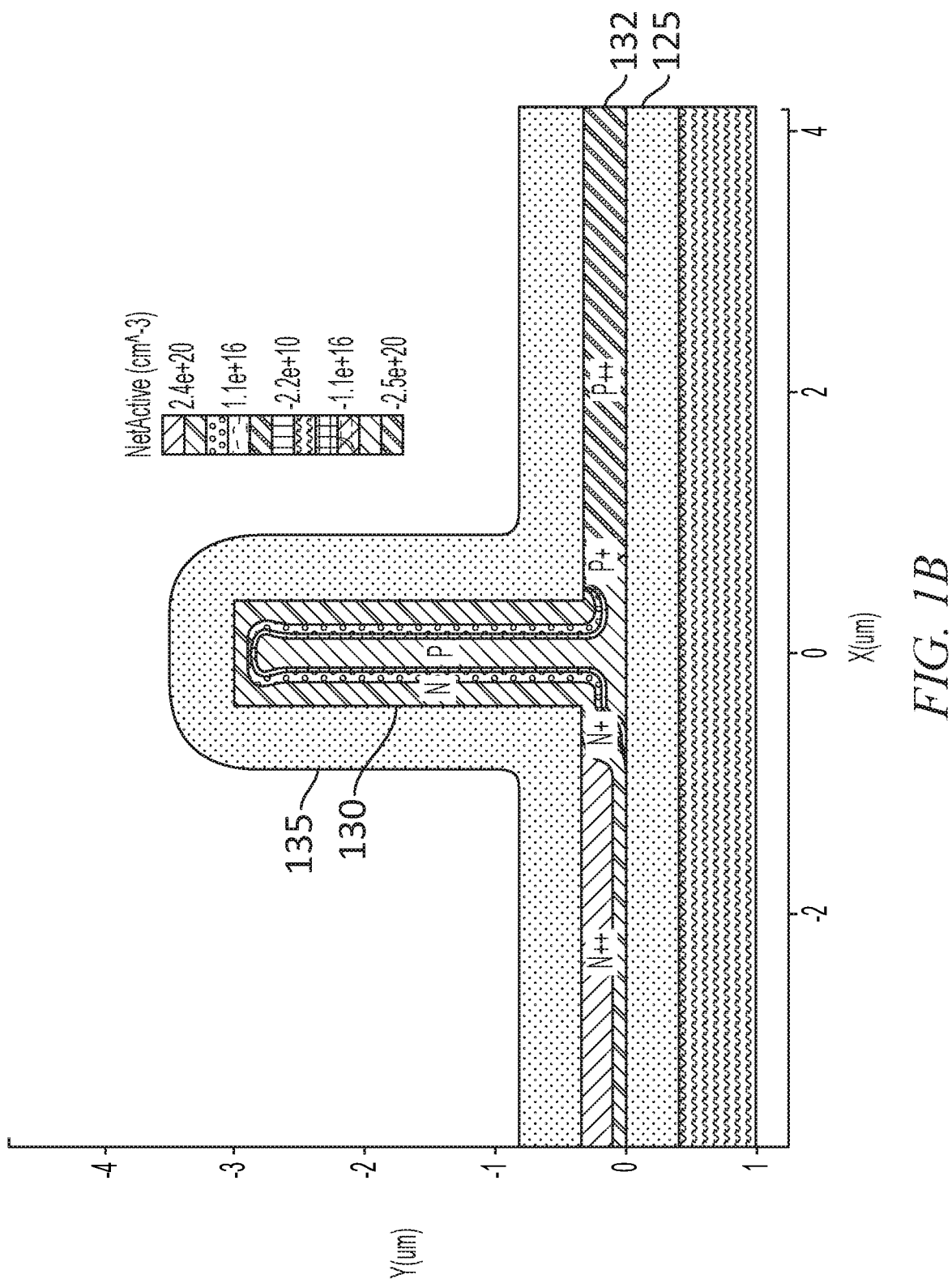
FIG. 1B is cross-sectional density diagram, according to an embodiment of the present disclosure.
Figure 1C:
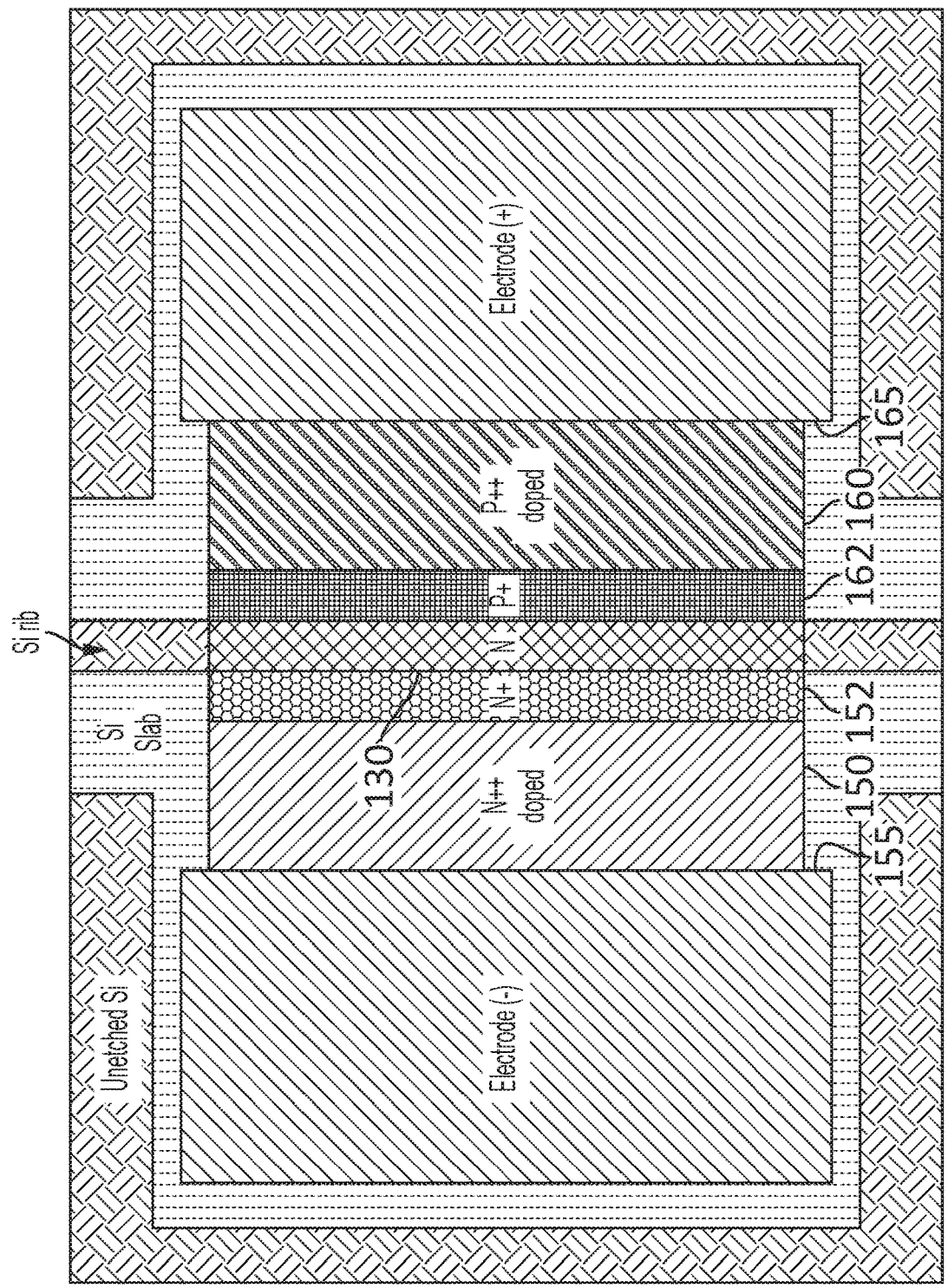
FIG. 1C is a schematic cross-sectional top view of a modulator, according to an embodiment of the present disclosure.

The silicon slab 132 adjacent to the rib 130 may have heavily doped regions in contact with the n- and p-doped regions of the pn-junction modulator. For example, a heavily n-doped region 150 may be in contact (either directly, or, as discussed below, through a region of intermediate doping level) with the n-doped surrounding region 145, and a metal contact 155 (e.g., an aluminum contact) may in turn be in contact with the heavily n-doped region 150. This arrangement may provide a current path with low series and contact resistance between the metal contact 155 and the n-doped surrounding region 145. Similarly, a heavily p-doped region 160 may be in contact (either directly, or, as discussed below, through a region of intermediate doping level) with the central p-doped region 140, and a metal contact 165 (e.g., an aluminum contact) may in turn be in contact with the heavily p-doped region 160, providing a current path with low series and contact resistance between the metal contact 165 and the central p-doped region 140. Intermediate doping level regions (an N+ region 152 and a P+ region 162) may be formed (i) between the n-doped surrounding region 145 and the heavily n-doped region 150, and (ii) between the central p-doped region 140 and the heavily p-doped region 160, respectively. The presence of such intermediate doping level regions may reduce the insertion loss of the modulator while maintaining the modulator performance (e.g., the phase efficiency and speed of the modulator). FIG. 1B shows an example of a doping profile for a structure like that of FIG. 1A. FIG. 1C shows a schematic top view of the phase modulator, showing the implanted regions, the metal contacts 155,165 and the waveguide rib 130.

Figure 1D:
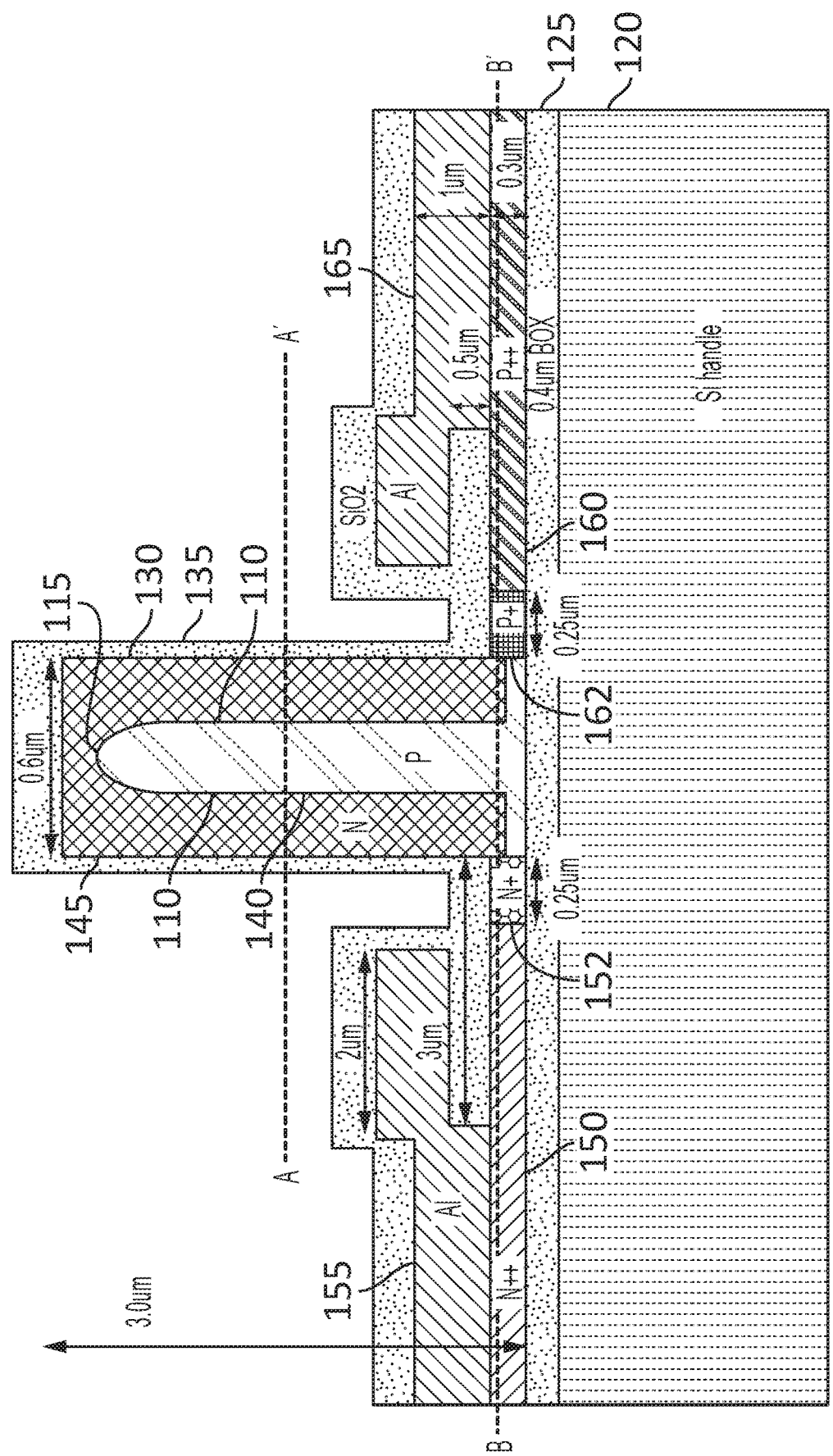
FIG. 1D is a schematic cross-sectional view of a modulator, according to an embodiment of the present disclosure.
Figure 1E:
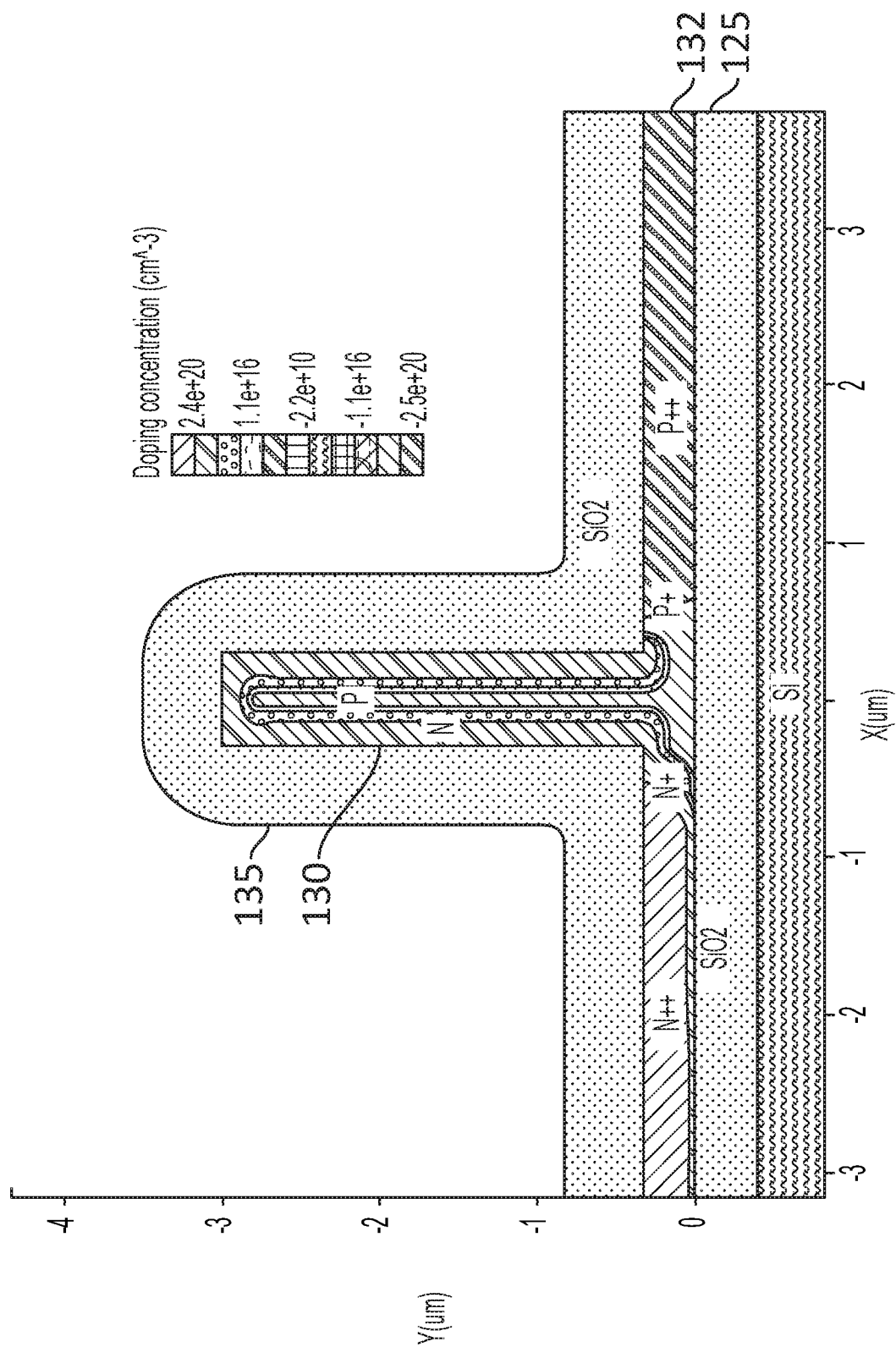
FIG. 1E is cross-sectional density diagram, according to an embodiment of the present disclosure.

FIG. 1D shows a pn-junction modulator, in some embodiments. The pn-junction modulator of FIG. 1D has a narrower waveguide than the pn-junction modulator of FIG. 1A, and the round p-n interface 115 is accordingly more semicircular than the round p-n interface 115 of the pn-junction modulator of FIG. 1A. FIG. 1E shows an example of a doping profile for a structure like that of FIG. 1D. In some embodiments, the round shape of the round p-n interface 115 is a result of the rib's doping profile being formed using ion implantation doping with large tilt angles (i.e., large declination angles), and without the use of vertical, or zero-degree tilt ion implantation, as discussed in further detail below.

A pn junction phase modulator such as those of FIGS. 1A and 1D, and of other similar embodiments, may be fabricated in a large silicon waveguide platform in which the waveguide thickness is larger than 1 um (the thickness being the dimension in the direction perpendicular to the plane of the substrate). The pn-junction phase modulator may be operated with a reverse bias and may have an efficiency $V\pi L < 1.2$ V cm. From the left side of the waveguide to the right side, the doping profile is 'n-p-n'. As the reverse bias voltage increases, the free holes in the p-region are depleted. The depletion may be significantly more efficient when two vertical p-n interfaces 110 are present than in embodiments with only one such vertical interface. Vertical n- and p-doped sections of the waveguide may be fabricated using large implant tilt angles, as discussed in further detail below.

Figure 1F:
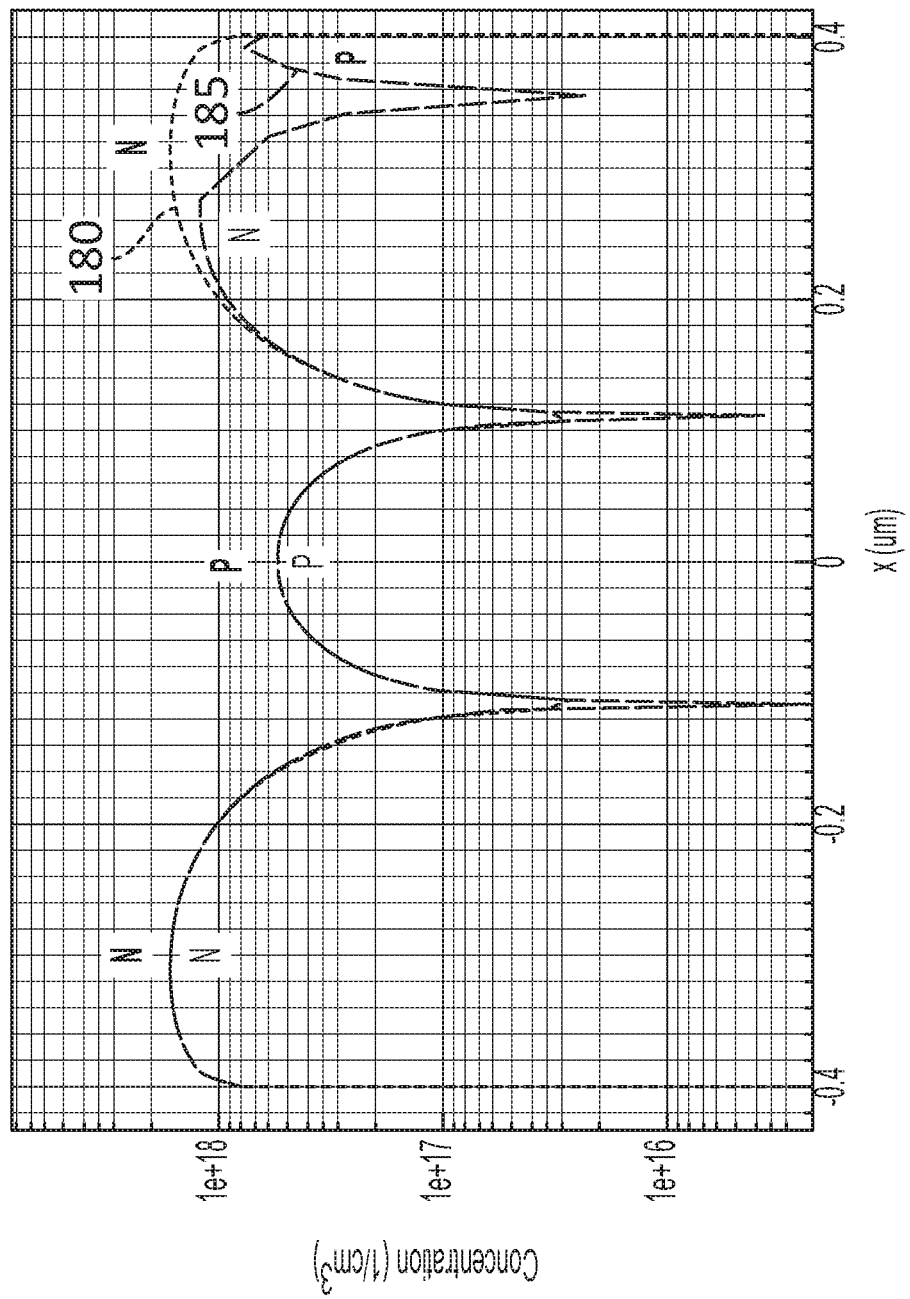
FIG. 1F is a graph of doping profiles of modulators, according to some embodiments of the present disclosure.
Figure 1G:
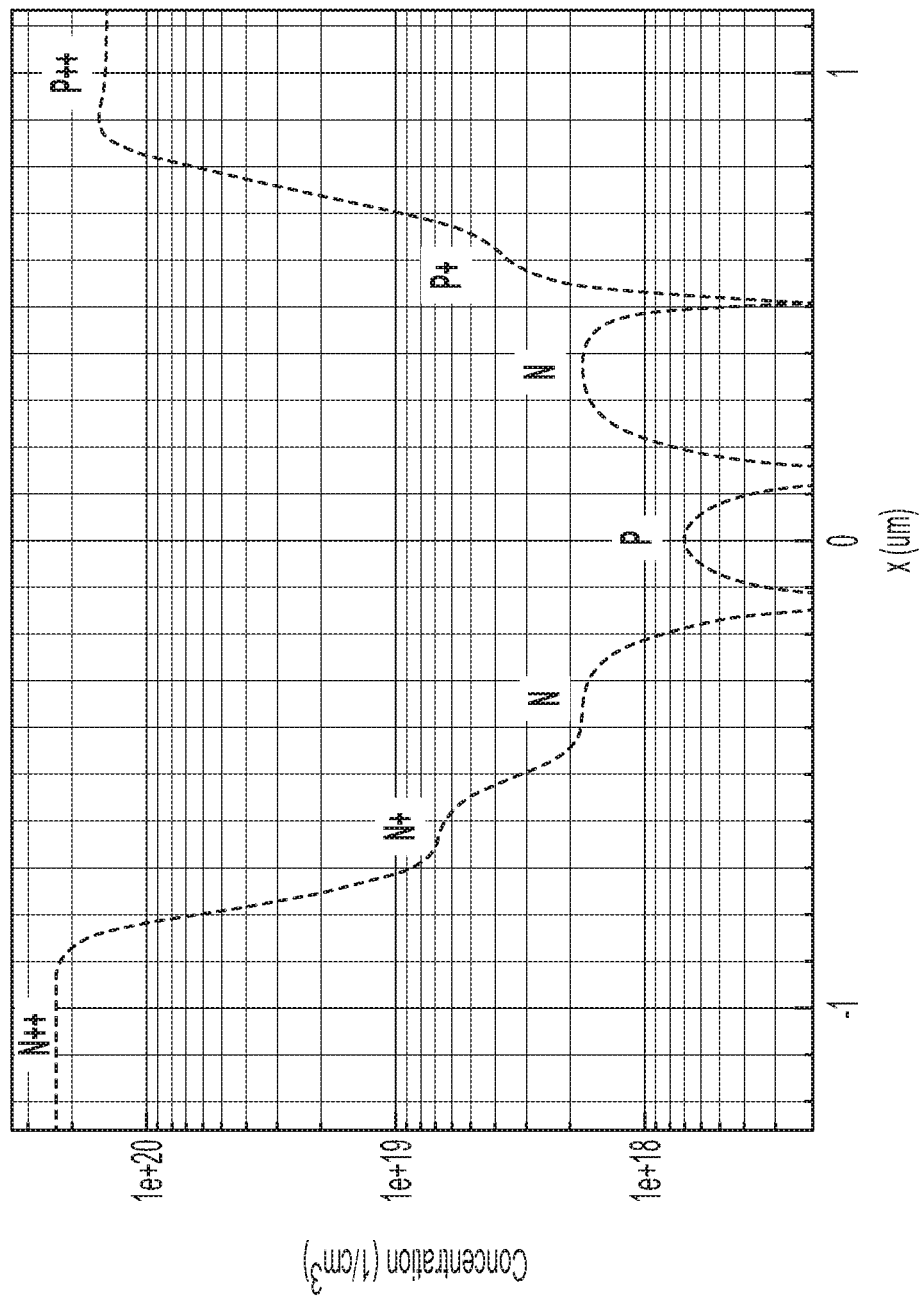
FIG. 1G is a graph of a doping profiles of a modulator, according to an embodiment of the present disclosure.
Figure 4A:
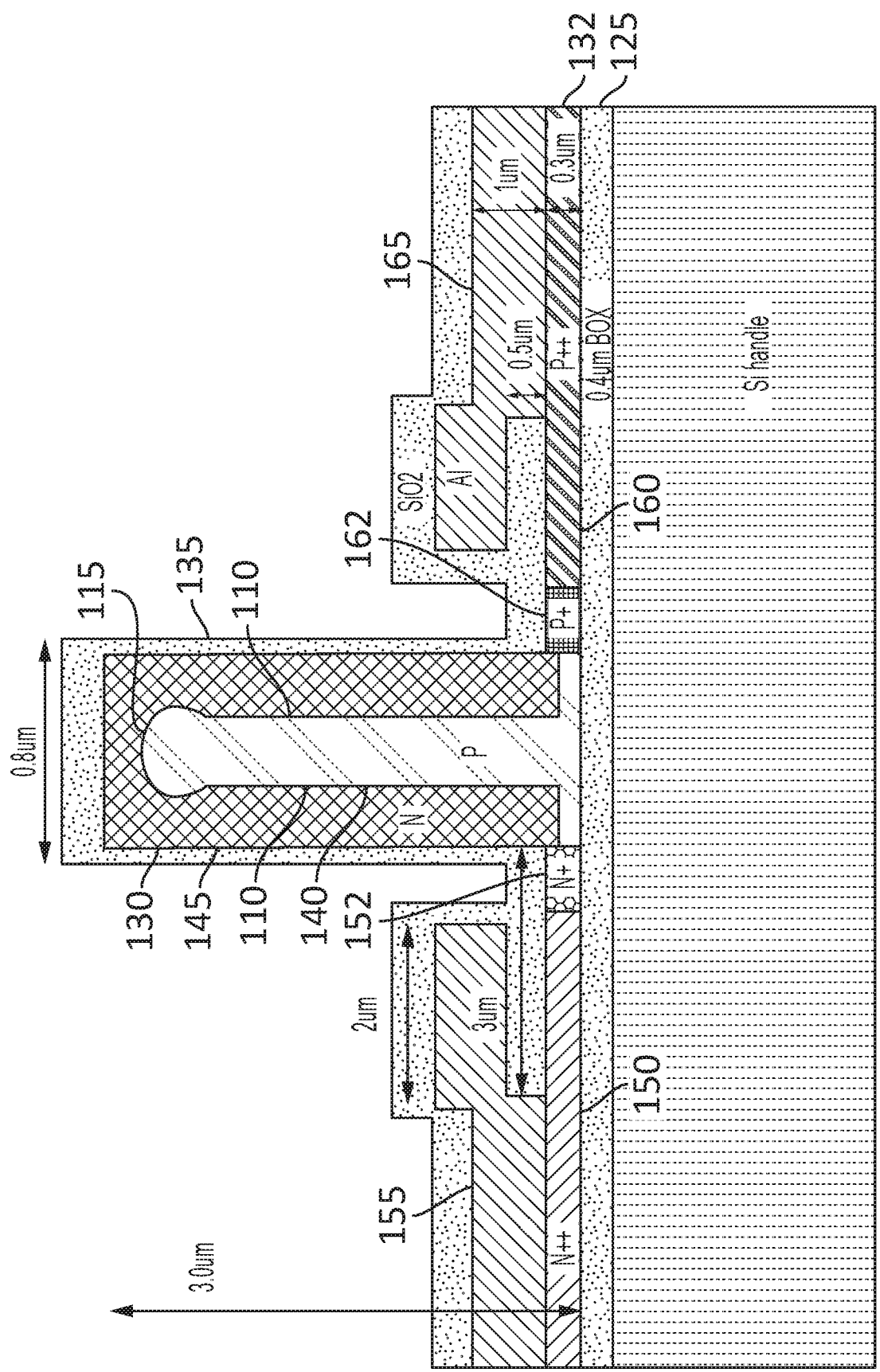
FIG. 4A is a schematic cross-sectional view of a modulator, according to an embodiment of the present disclosure.
Figure 4B:
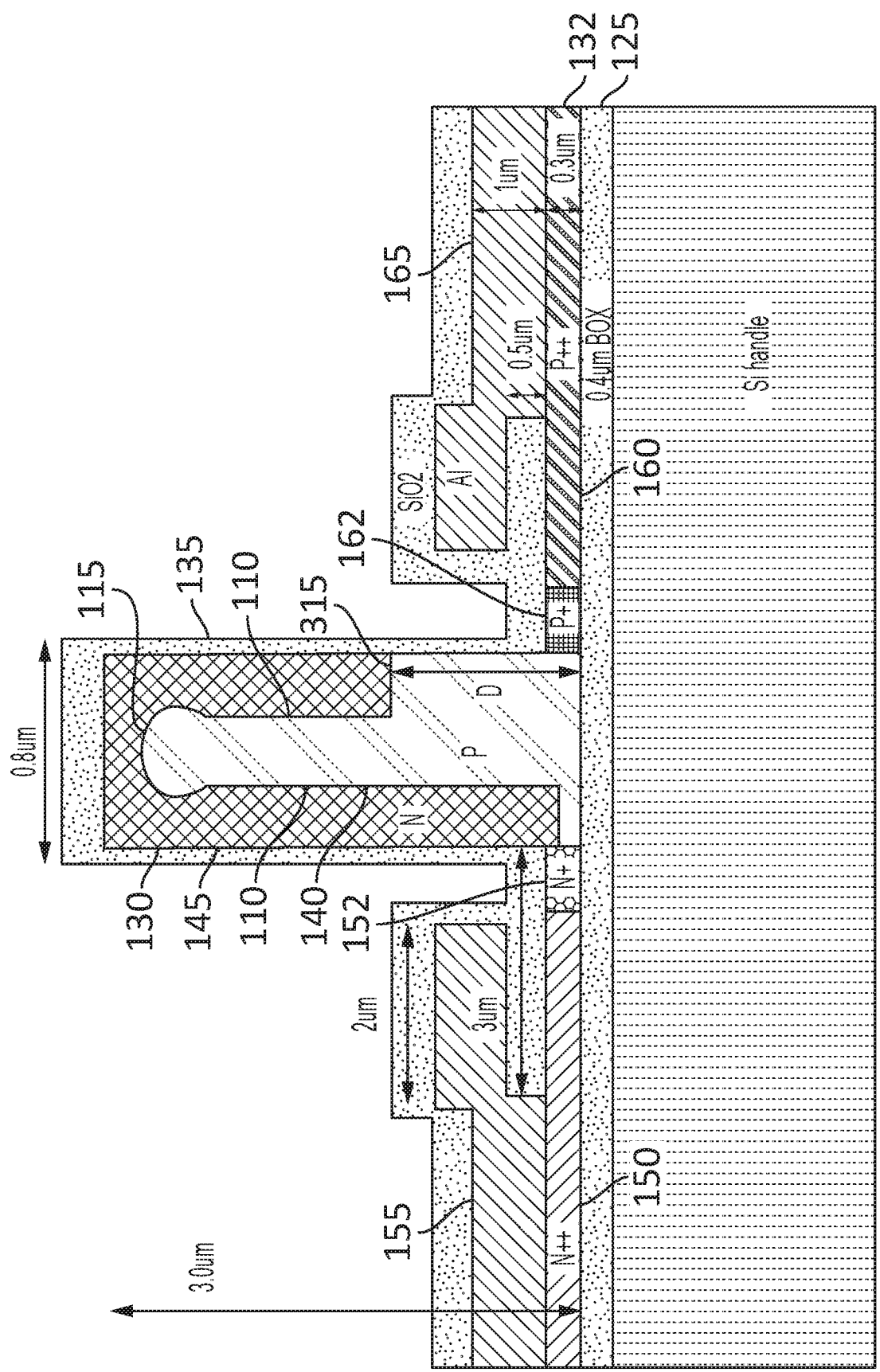
FIG. 4B is a schematic cross-sectional view of a modulator, according to an embodiment of the present disclosure.
Figure 4C:
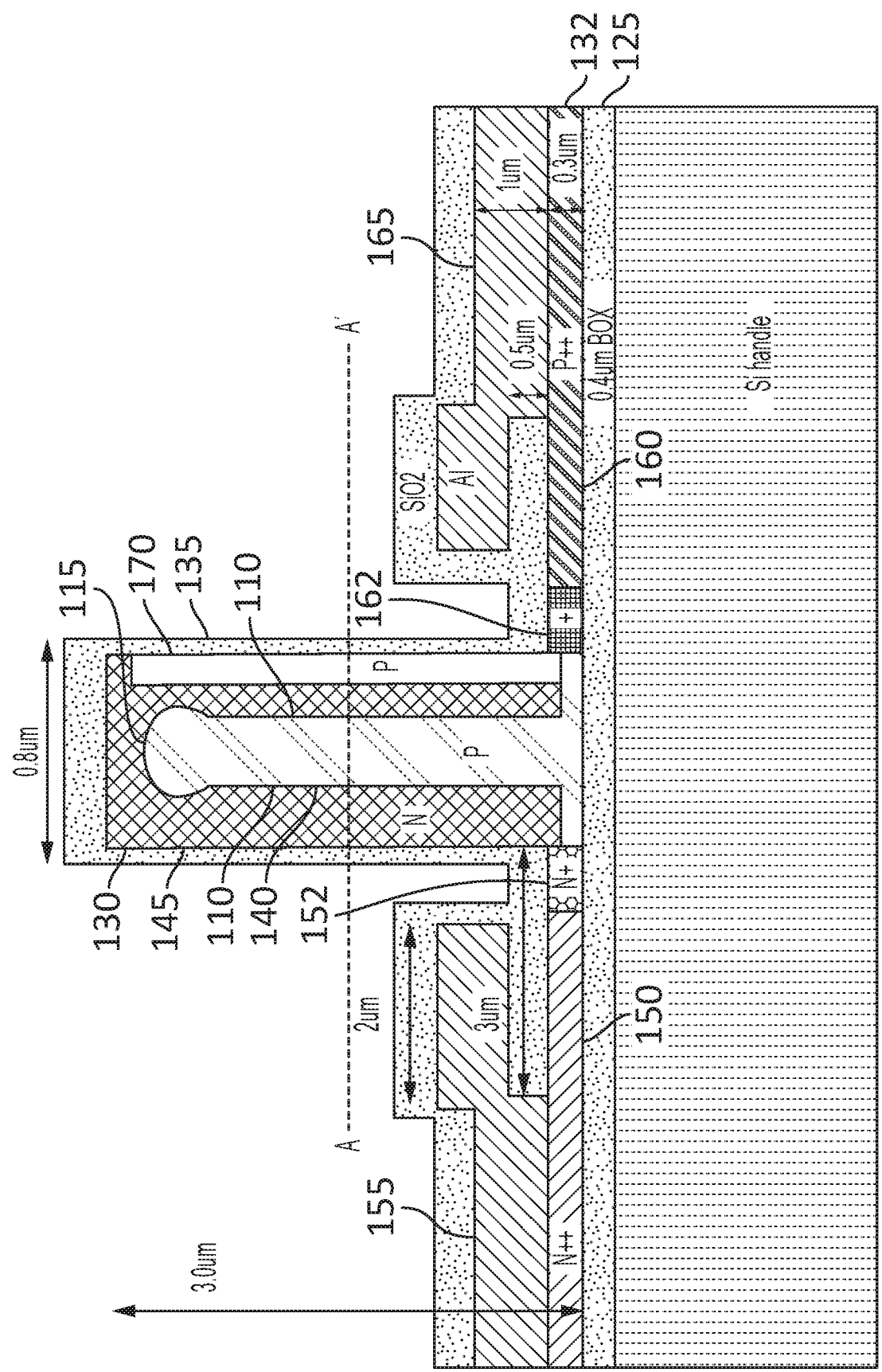
FIG. 4C is a schematic cross-sectional view of a modulator, according to an embodiment of the present disclosure.
Figure 4D:
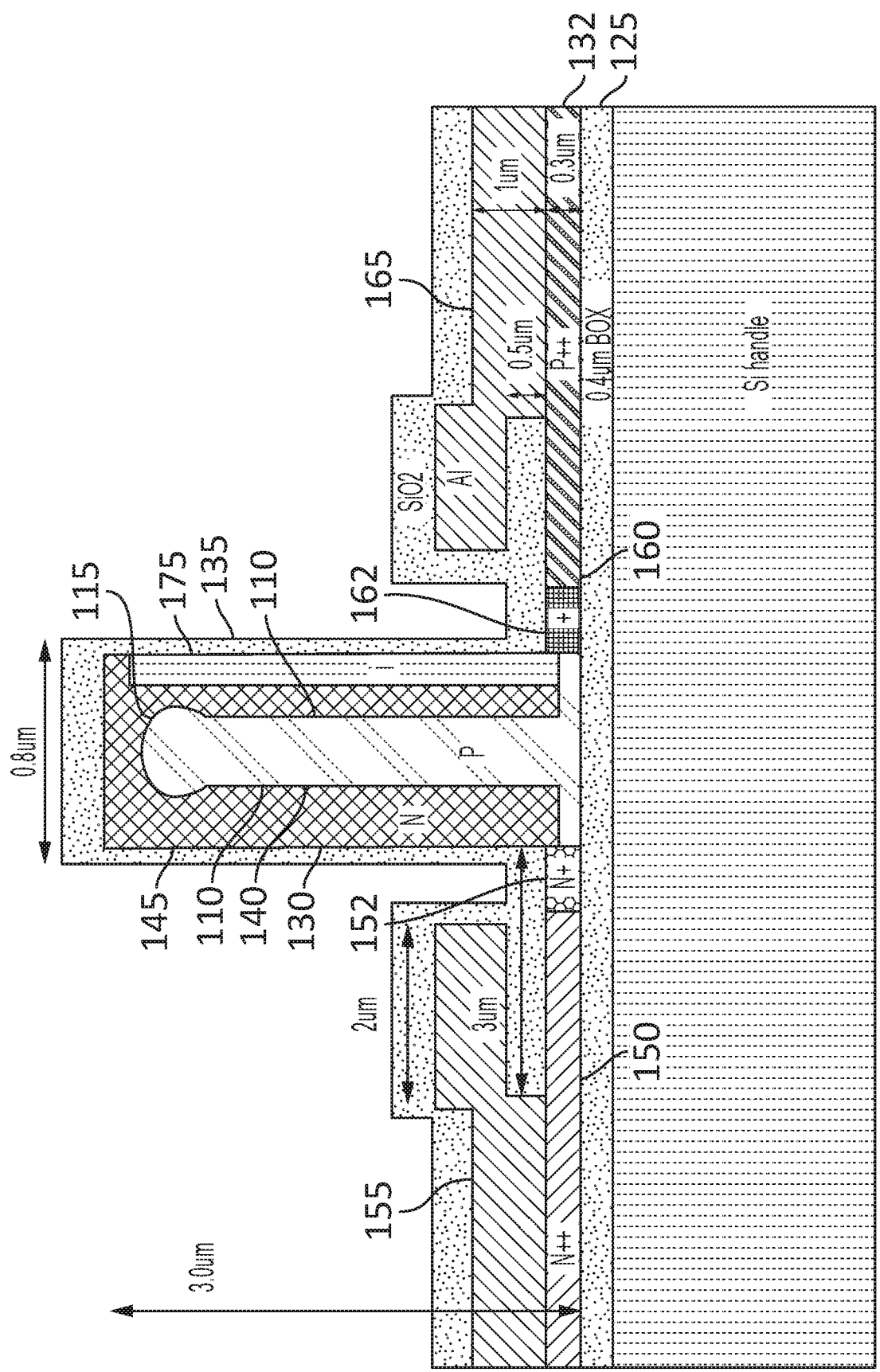
FIG. 4D is a schematic cross-sectional view of a modulator, according to an embodiment of the present disclosure.
Figure 4E:
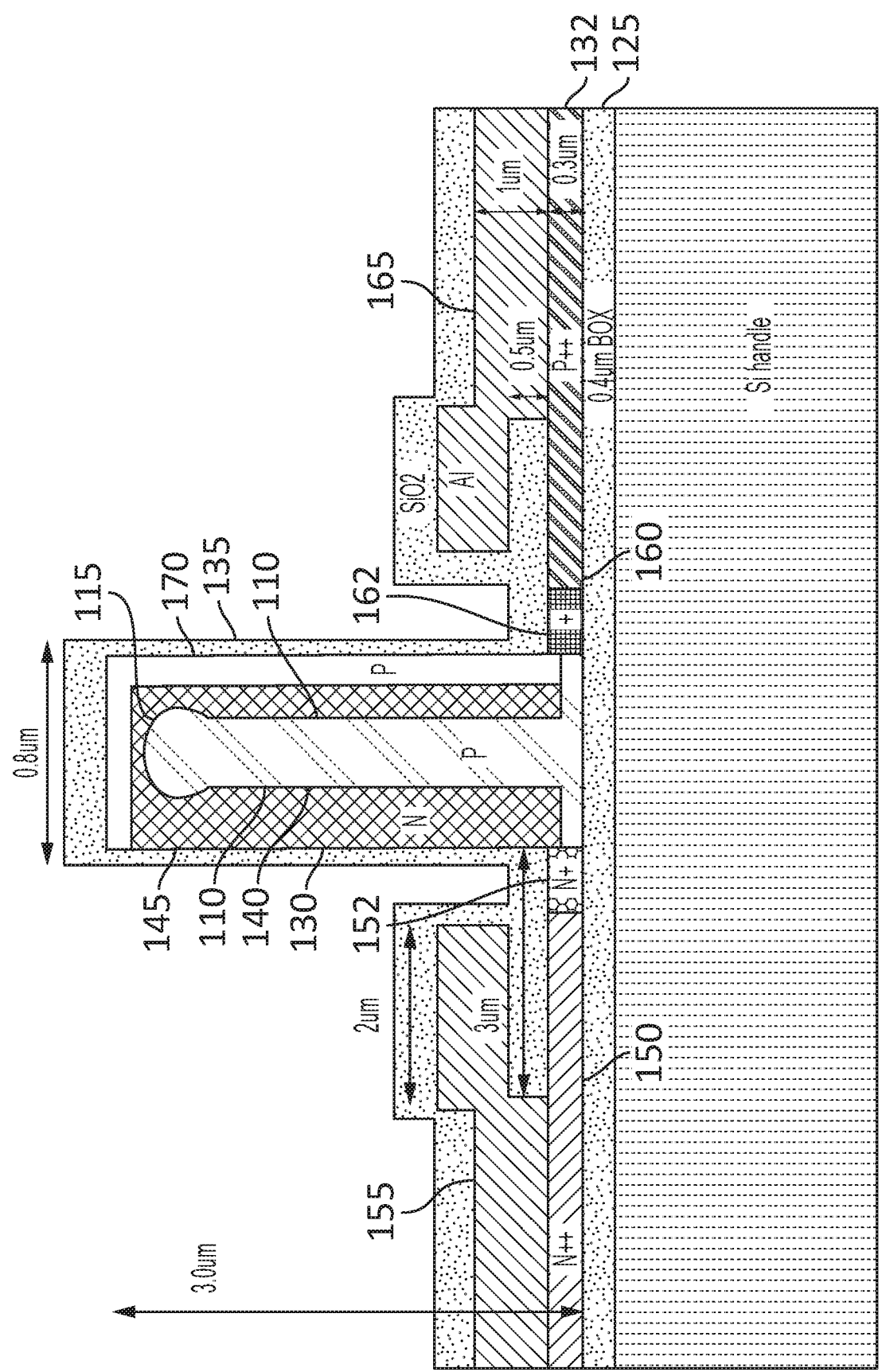
FIG. 4E is a schematic cross-sectional view of a modulator, according to an embodiment of the present disclosure.
Figure 4F:
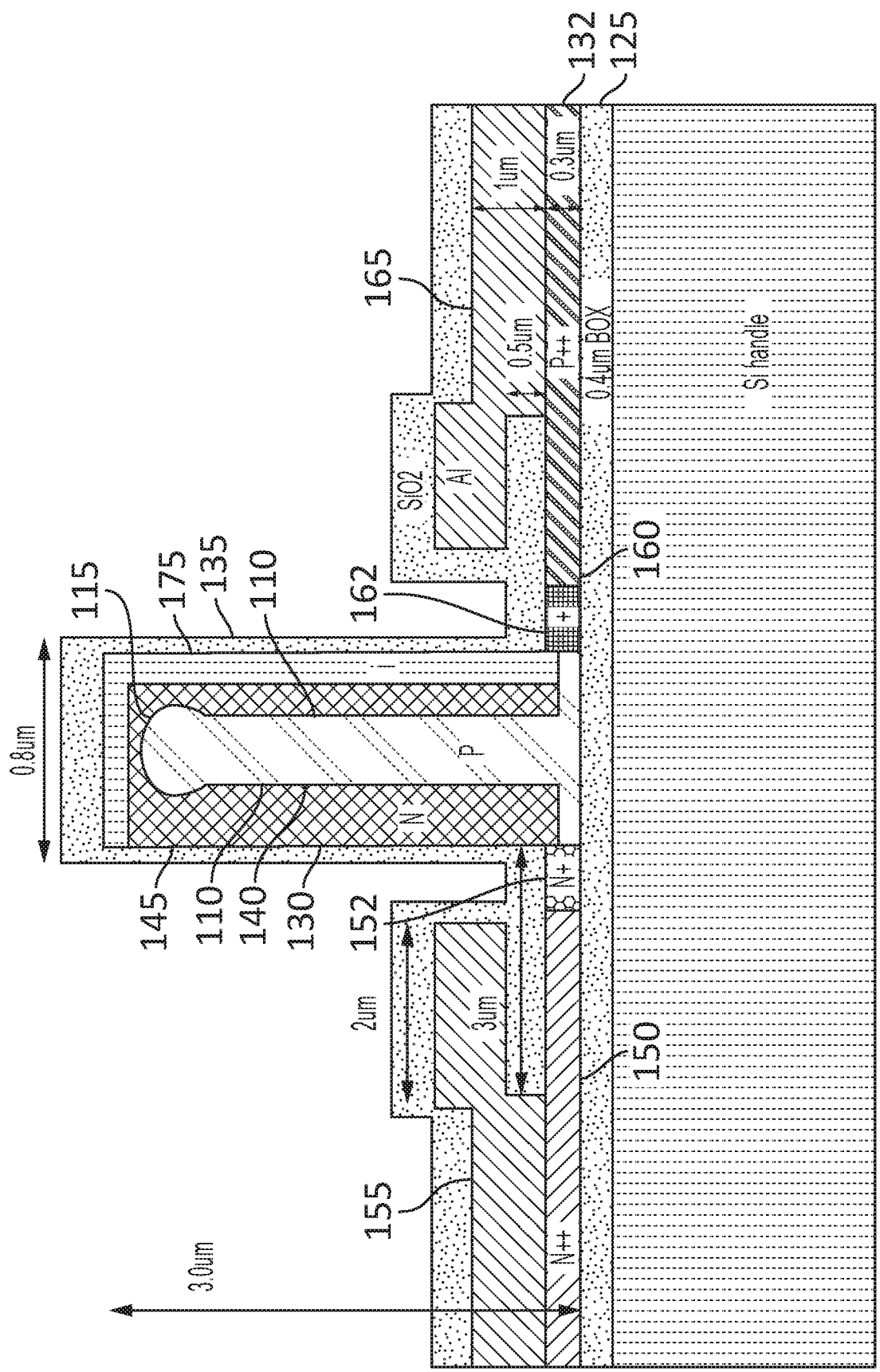
FIG. 4F is a schematic cross-sectional view of a modulator, according to an embodiment of the present disclosure.

FIG. 1F is a graph of the doping profile of a phase modulator with a waveguide width of 800 nm, taken (i) along the line A-A' of FIG. 1A (in a first curve 180) and (ii) along the line A-A' of FIG. 4C (in a second curve 185). FIG. 1G is a graph of a doping profile of the slab region of the phase modulator of FIG. 1A, taken along the line B-B'. As mentioned above, intermediate doping level regions (regions 152, 162 (FIG. 1A) with N+ and P+ doping levels) may be present.

In some embodiments, the aspect ratio of the waveguide, which is the ratio of the waveguide height to its width, is larger than 3. In some cases, it is less than 6. The aspect ratio may affect the performance of the modulator. For example, the table of FIG. 2 shows dimensions of some embodiments, with waveguide heights (i.e., thicknesses) ranging from 1.0 microns to 3.0 microns, and widths ranging from 0.5 microns to 1.0 microns. Ranges of aspect ratios are shown in the third column of the table of FIG. 2. A figure of merit for a phase modulator may be the ratio of (i) the product of the length of the modulator and the voltage that will produce a π phase shift to (ii) the 3 dB bandwidth of the modulator. In the table of FIG. 2, the fourth, fifth and sixth column show the waveguide width for which the figure of merit may have higher values, the corresponding aspect ratio, and the corresponding phase shift contribution from the vertical p-n interfaces 110, respectively. In some embodiments, a modulator may have a length between 2.0 mm and 3.0 mm and it may achieve a phase shift of π for a modulating voltage of between 4.0 V and 6.0 V. The short device length may enable high speed phase modulation in the GHz bandwidth regime.

Figure 3A:
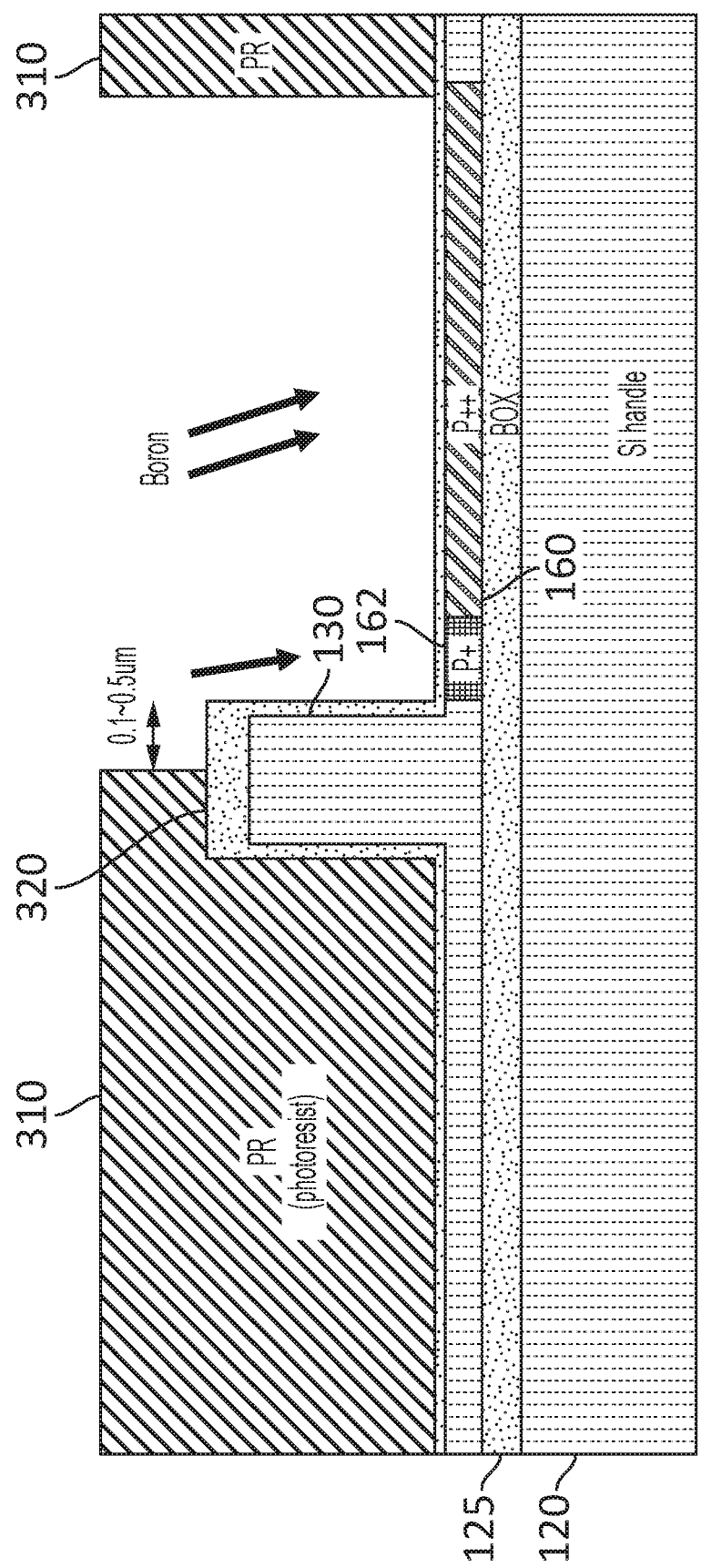
FIG. 3A is a schematic cross-sectional view of an intermediate product in a process for fabricating a modulator, according to an embodiment of the present disclosure.

FIGS. 3A-3D show process steps for fabricating a modulator, in some embodiments. FIG. 3A shows an ion implantation step in which the heavily p-doped region 160 is formed by implantation of ions, e.g., boron ions as shown. The rib 130 may have, on its top surface, a thicker layer of silicon dioxide that functions as a hard mask 320 and blocks the boron ions, so that during this step they are not implanted in the rib 130. Photoresist 310 may shield all of the device except for (i) the portion of the slab 132 where the heavily p-doped region 160 is to be formed, and (ii) a portion of the rib 130, as shown (only a portion of the rib 130 is shielded, the rib itself being shielded by the hard mask 320, so that imprecision in the formation of the photoresist 310 will not affect the edge of the heavily p-doped region 160 nearest the rib 130). The tilt angle, which in FIG. 3A refers to an elevation angle measured from the nadir, may be between 0 degrees and 7 degrees, for example, and accordingly the implantation angle may be between 90 degrees and 83 degrees. The P+ intermediate doping level region 162 may be formed in a similar ion implantation step (performed before or after the ion implantation step used to form the heavily p-doped region 160), with a tilt angle of about 1.5 degrees, and a lower implantation dose than that used to form the heavily p-doped region 160. If a P+ intermediate doping level region 162 is to be formed, a tilt angle of greater than 0 degrees may be used for the high dose ion implantation step (used to form the heavily p-doped region 160), and, during the high dose ion implantation step, the intermediate doping level region 162 may be shielded by the hard mask 320. As used herein, the "implantation angle" is the angle of declination (or angle of depression) (measured from the horizontal), of the direction of the ions in an ion implantation operation. The azimuth of the direction of the ions may be such that the top of the rib 130 shields the sidewall of the rib that is not protected by photoresist 310.

Figure 3B:
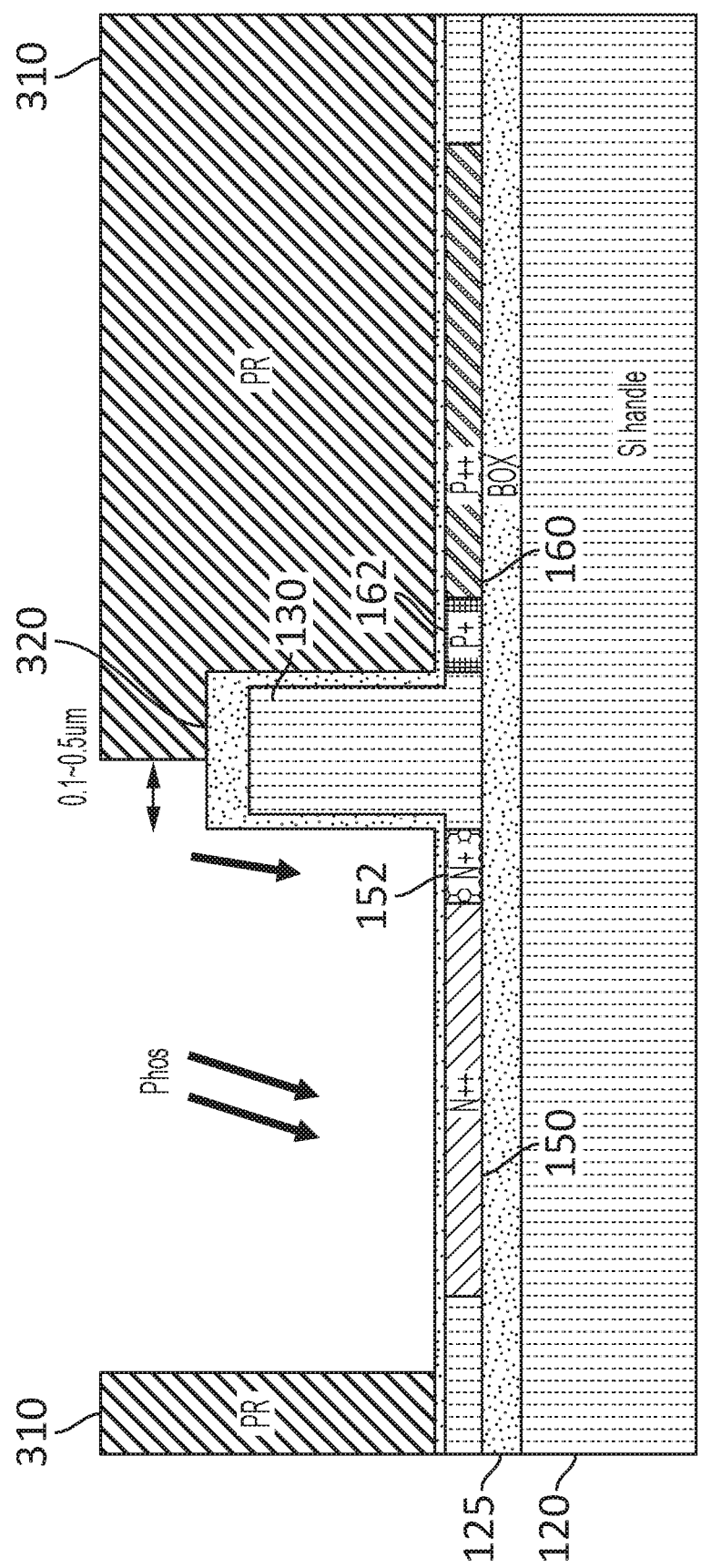
FIG. 3B is a schematic cross-sectional view of an intermediate product in a process for fabricating a modulator, according to an embodiment of the present disclosure.

FIG. 3B shows an ion implantation step in which the heavily n-doped region 150 is formed by implantation of ions, e.g., phosphorous ions ("Phos"), as shown, or arsenic ions. As in the operation illustrated in FIG. 3A, the rib 130 may have a silicon dioxide hard mask 320 on its top surface, and photoresist 310 may shield all of the device except for (i) the portion of the slab 132 where the heavily n-doped region 150 is to be formed, and (ii) a portion of the rib 130, as shown. The tilt angle, which in FIG. 3B also refers to an elevation angle measured from the nadir, may be between 0 degrees and 7 degrees, for example. The azimuth of the direction of the ions may be such that the top of the rib 130 shields the sidewall of the rib that is not protected by photoresist 310. In a step analogous to the step described above for forming the P+ intermediate doping level region 162, an N+ intermediate doping level region 152 may be formed by (i) shielding the corresponding region from the high dose of n-dopant by the hard mask 320 (and using a tilt angle of greater than 0 degrees for the high dose ion implantation step) and (ii) performing a separate, lower dose implantation step with a lower tilt angle (e.g., about 1.5 degrees).

Figure 3C:
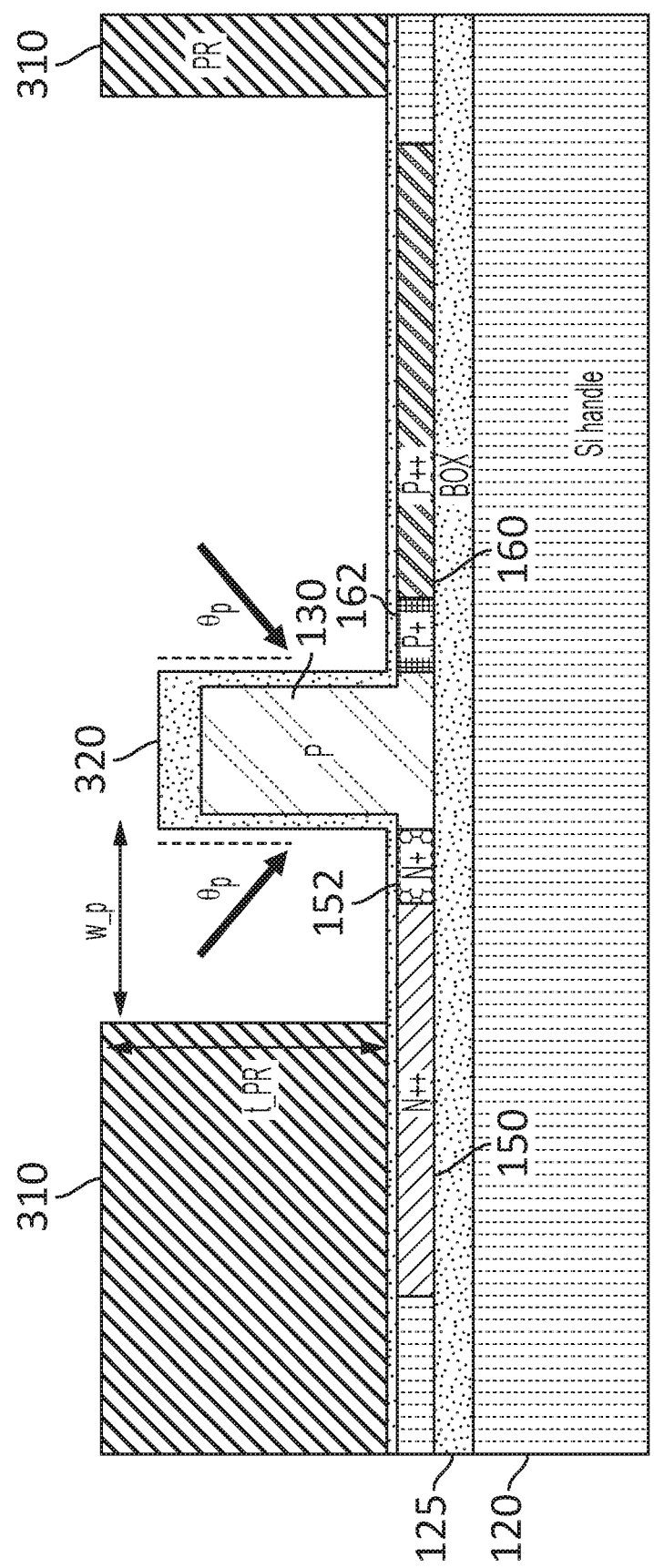
FIG. 3C is a schematic cross-sectional view of an intermediate product in a process for fabricating a modulator, according to an embodiment of the present disclosure.

FIG. 3C shows an ion implantation step in which the p-dopant ions (e.g., boron ions) are implanted in the rib 130. The tilt angle, which in FIG. 3C refers to an angle of declination (or an angle of depression) measured from the horizontal, may be between 45 degrees and 60 degrees, for example. Photoresist 310 may partially cover the heavily n-doped region 150. This may have the benefit of protecting the heavily n-doped region 150 from implantation by p-dopant ions, although the p-dopant dose may be sufficiently low that the doping concentration of the heavily n-doped region 150 is affected only slightly in any portion of the heavily n-doped region 150 that is not protected by photoresist 310 (e.g., the N++ doping concentration may be about 2e20/cm^3 and the P doping concentration added in this step may be between about 1e18/cm^3 and about 2e18/cm^3, so that the net doping concentration in the heavily n-doped region 150 may be affected only slightly by whether the heavily n-doped region 150 is exposed to the implantation by p-dopant ions). In some embodiments photoresist is entirely absent from the heavily n-doped region 150 or from the partially fabricated modulator during this step (photoresist may however be present on other parts of the chip to protect other structures). The separation w_p between the edge of the photoresist and the rib 130 may be chosen such that w_p=t_PR*tan($\theta_p$)+margin_p, where t_PR is the thickness of the photoresist, $\theta_p$ is the implantation angle, and margin_p is an adjustable parameter that may be set (e.g., so that margin_p>1 um) to assure that the whole rib section is implanted with boron. After the step of FIG. 3C is completed, the hard mask 320 (and the oxide layer on the sidewalls of the waveguide and the surrounding slab 132) may be removed using a wet etch, and replaced with a new oxide layer that may be thinner than the hard mask 320. For example, the new oxide layer may be 50 nm thick.

Figure 3D:
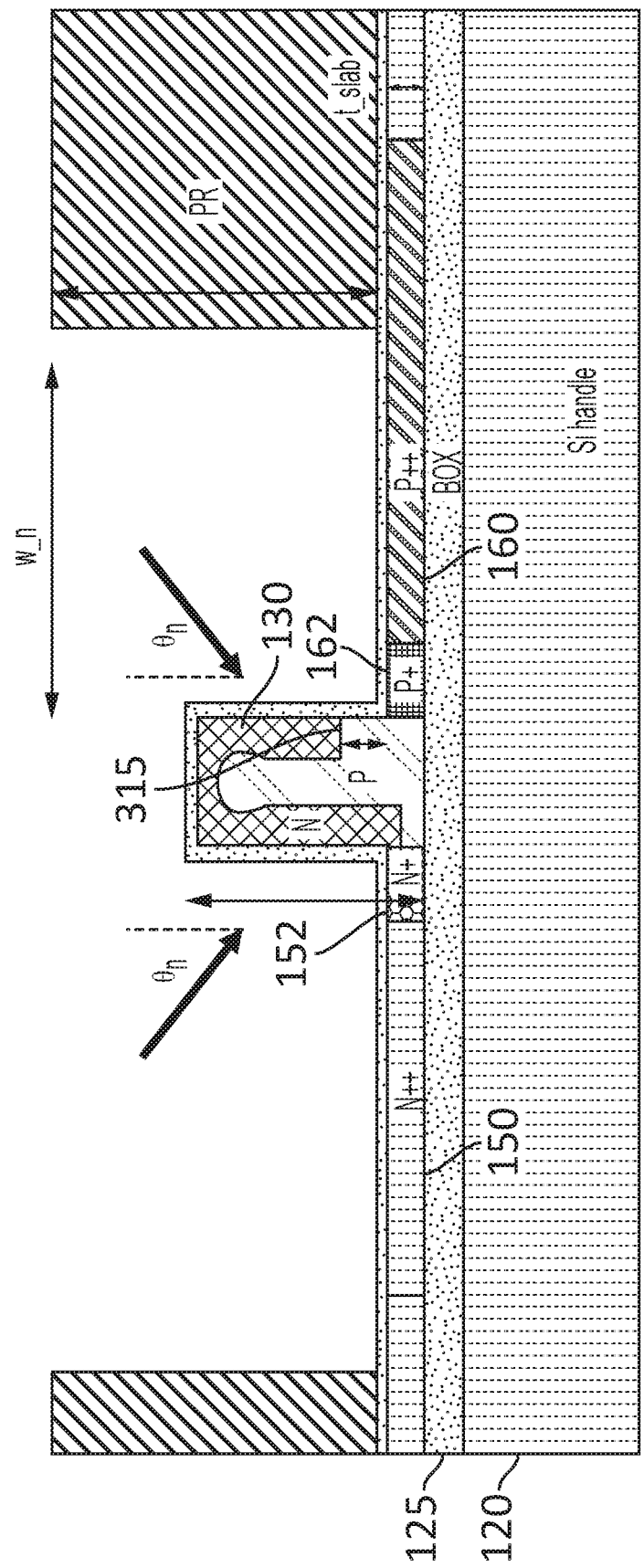
FIG. 3D is a schematic cross-sectional view of an intermediate product in a process for fabricating a modulator, according to an embodiment of the present disclosure.

FIG. 3D shows an ion implantation step in which the n-dopant ions (e.g., phosphorus or arsenic ions) are implanted in the rib 130, to form the surrounding (n-doped) region 145 and to form (as the central remainder of the rib, that is not converted from p-type to n-type by this ion implantation step) the central p-doped region 140. In a manner analogous to that of the step illustrated in FIG. 3C, photoresist 310 may partially cover the heavily p-doped region 160. As in the case of the step illustrated in FIG. 3C, the presence of photoresist 310 may be optional and in some embodiments some or all of the photoresist 310 illustrated in FIG. 3D is absent. The central doped region 140 may include a shelf 315 on the side of the heavily p-doped region 160; the shelf may have a height D above the upper surface of the heavily p-doped region 160 (for negative values of D, the height of the shelf 315 may be lower than that of the upper surface of the heavily p-doped region 160). In some embodiments, the doping operations may be performed in a different order than that described in some examples herein; for example, the operations of FIG. 3D may be performed before those of FIG. 3C.

The separation w_n between the edge of the photoresist and the rib 130 may be lithographically controlled for target junction shape, according to whether or not a self-aligned process is used. In a first embodiment, a self-aligned process is used, and w_n may be chosen according to w_n=t_PR*tan($\theta_n$)+margin_n, where margin_n is an adjustable parameter that may be set to be larger than 0, e.g., larger than 0.5 um, to ensure that the self-aligned junction has an acceptable shape even with process variation of t_PR and w_n. In this first embodiment, D may be between −100 nm and 0. In a second embodiment, w_n may be chosen according to w_n=(t_PR-D)*tan($\theta_n$) where D is between 0 and (t-t_slab), where t is the height of the rib 130 and t_slab is the thickness of the slab 132.

FIGS. 4A-4E show modulator structures, according to some embodiments. FIG. 4A shows how the shape of the wrap-around junction (i.e., the junction, which includes the two vertical p-n interfaces 110 and the round p-n interface 115) may be affected by photolithography, using a self-aligned fabrication process. In the self-aligned case, the modulator structure, and, in particular the junction shape may be relatively unaffected by incremental changes in the photoresist thickness or mask alignment. For example, as mentioned above, if D is chosen to be less than 0 (in FIG. 3D), then the alignment of the photoresist in FIGS. 3A-3D has little effect on the modulator structure (the presence or absence of photoresist on the heavily doped regions 150, 160 having little effect on their net doping concentrations). By contrast, the process of FIG. 3D is not self-aligned if D is chosen to be greater than 0 (as shown in FIG. 4B), because in this case variations in the alignment of the photoresist 310 may affect the modulator structure (by affecting D).

FIGS. 4C-4F show embodiments in which an additional, or "secondary", P region 170 (FIGS. 4C and 4E), or an intrinsic region 175 (FIGS. 4D and 4F) may be made at a waveguide sidewall (and, in some embodiments (FIGS. 4E and 4F), at the top of the waveguide, forming, for example, a region having an inverted-L shape) by a counter-doping method. In such an embodiment, the junction profile may become N/P/N/P or N/P/N/i where P and i refer to the secondary P region 170 and the intrinsic region 175, respectively. A modulator according to FIGS. 4C and 4D, with a secondary P region or an intrinsic region (labeled "i") may have smaller capacitance, larger bandwidth, and lower loss than a device without such a region. The embodiments of FIGS. 4C and 4D may be fabricated by performing an additional, "secondary" ion implantation operation with p-dopant ions, at the step illustrated in FIG. 3A, with an implantation angle and implantation energy selected to implant p-dopant ions just below the surface of the right sidewall of the rib 130. This secondary ion implantation operation may be performed, for example, with an implantation energy corresponding to an accelerating voltage of 90 kV and a tilt angle of 10 degrees from the vertical. The azimuth of the direction of the ions may be such that the ions impinge on and penetrate the right sidewall of the rib 130. The subsequent ion implantation operation of FIG. 3C may then be performed with an implantation energy corresponding to an accelerating voltage of 150 kV. The embodiments of FIGS. 4E and 4F may be fabricated by instead performing the secondary ion implantation operation, with p-dopant ions, before the step illustrated in FIG. 3D, i.e., after the hard mask 320 has been removed and replaced with the thinner oxide layer. The absence of the hard mask 320 during the secondary ion implantation operation may then allow the ions to be implanted at the top surface of the waveguide rib 130, in addition to the sidewall. As a result, the secondary P region 170, or the intrinsic region 175, may have an inverted-L shape, as shown for example in FIGS. 4E and 4F. The intrinsic regions of FIGS. 4D and 4F may be formed in a structure such as that of FIG. 4C or 4E, respectively, by application of a suitable reverse bias. In some embodiments, the intrinsic regions of FIGS. 4D and 4F may be formed by suitable selection of doping doses during the counter-doping operation, such that the net carrier level after doping and counter-doping is zero or nearly zero in the intrinsic regions.

Figure 5A:
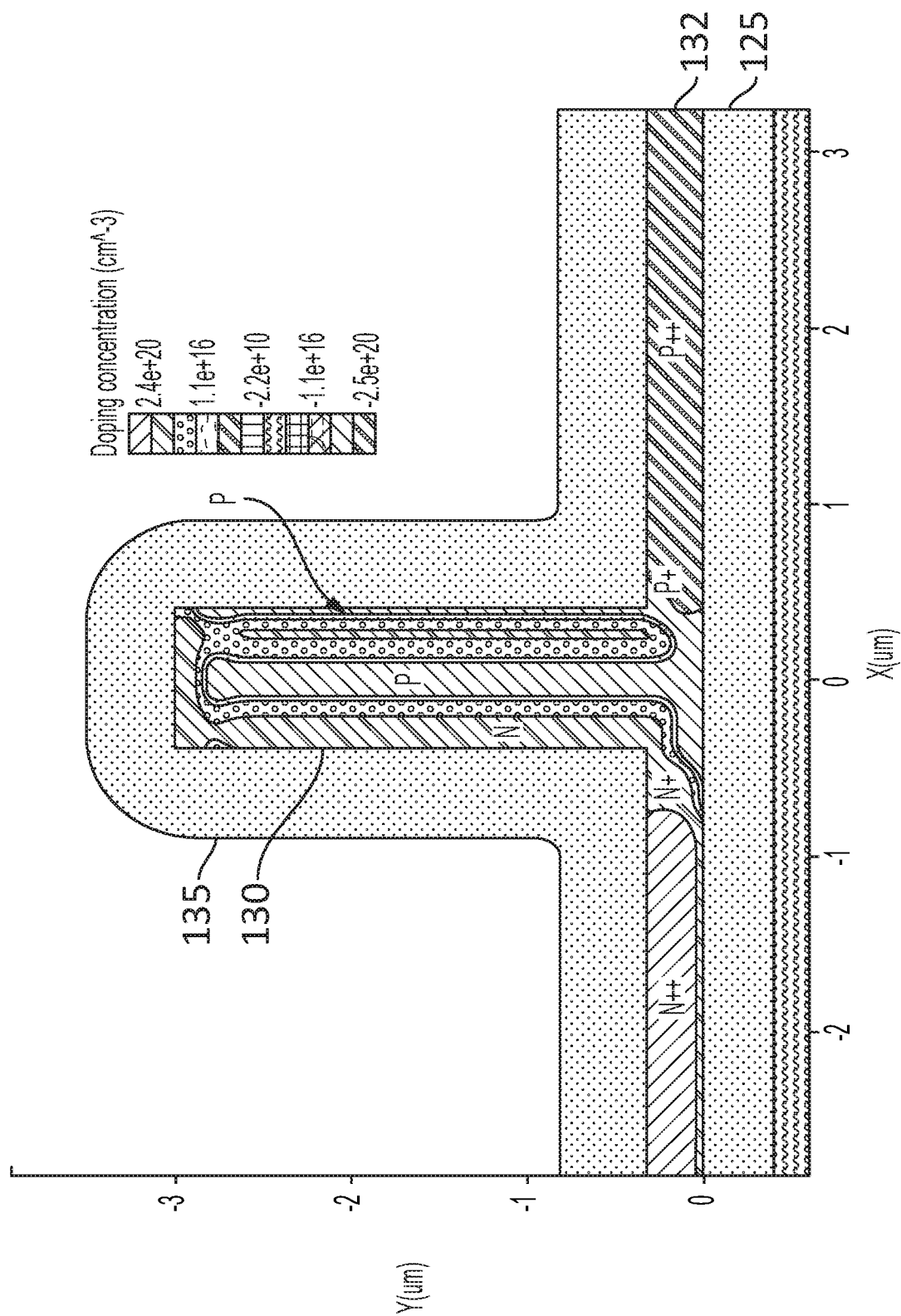
FIG. 5A is cross-sectional density diagram, according to an embodiment of the present disclosure.
Figure 5B:
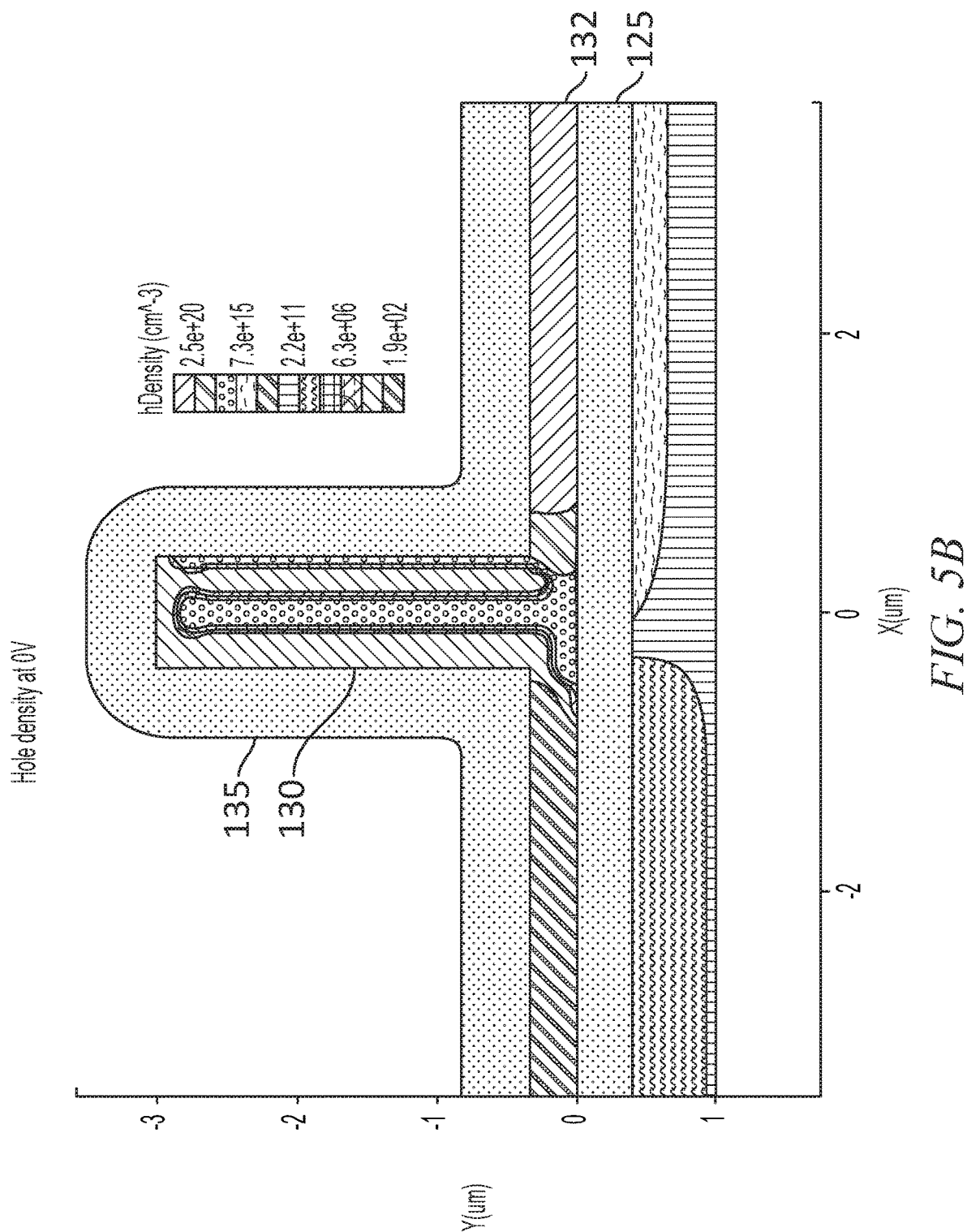
FIG. 5B is cross-sectional density diagram, according to an embodiment of the present disclosure.
Figure 5C:
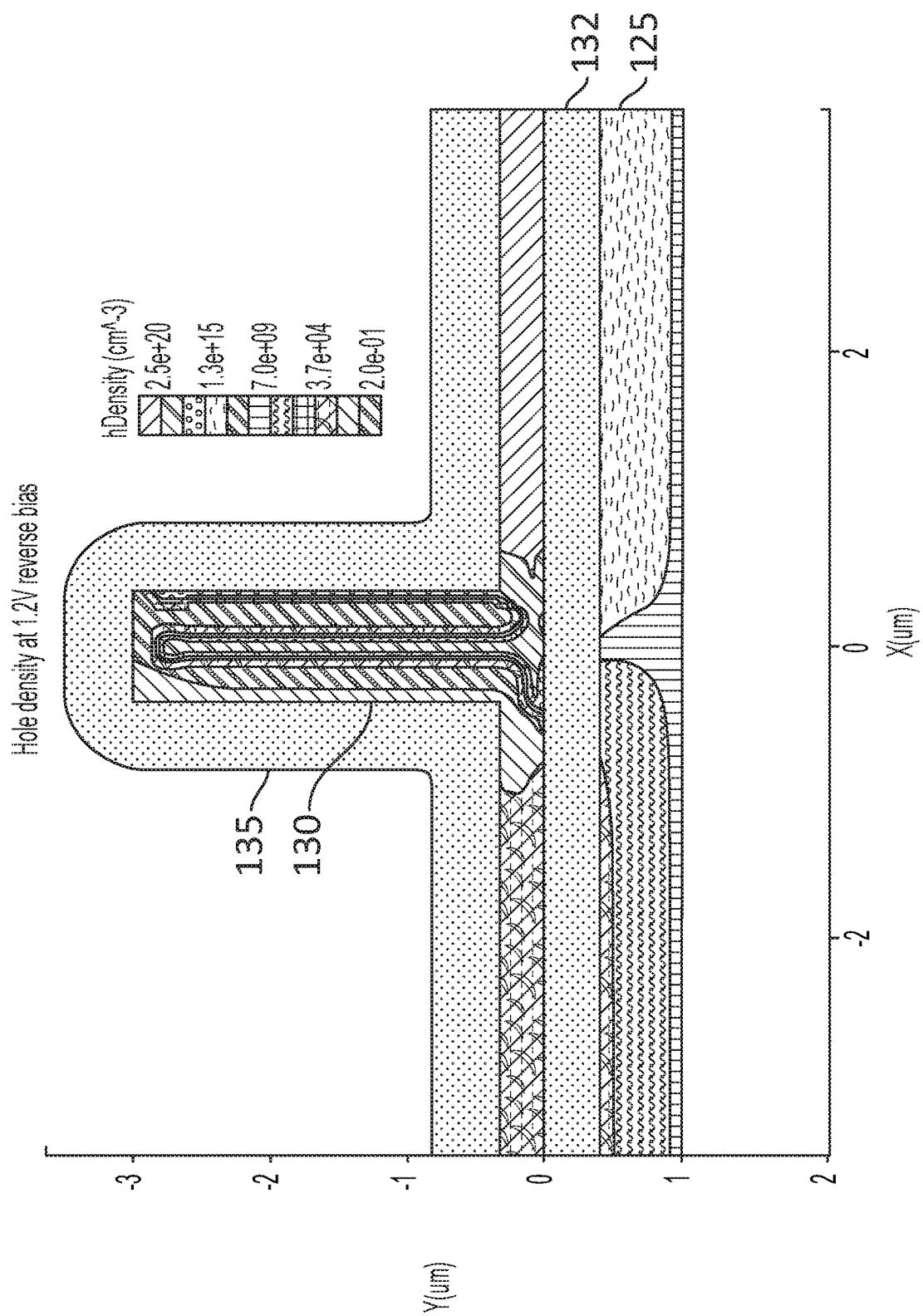
FIG. 5C is cross-sectional density diagram, according to an embodiment of the present disclosure.
Figure 5D:
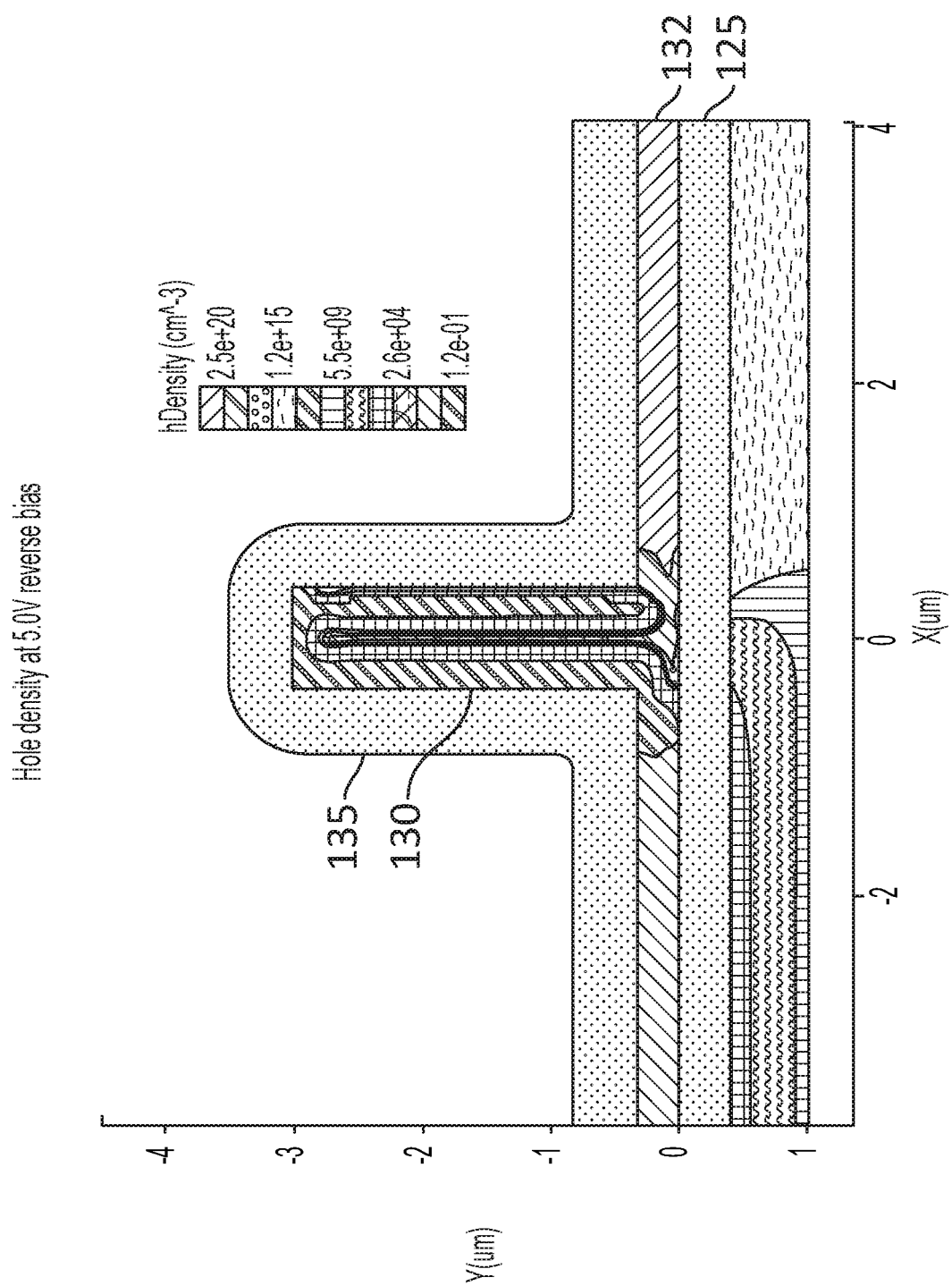
FIG. 5D is cross-sectional density diagram, according to an embodiment of the present disclosure.

FIGS. 5A and 5B show the simulated doping concentration, and the simulated hole concentration, respectively, of an embodiment (e.g., the device of FIG. 4C) having a self-aligned junction with a secondary P region 170 in the waveguide, at 0 V bias. From FIG. 5B it may be seen that the secondary P region 170 on the right side of the waveguide rib 130 has net P-doping. FIG. 5C shows the simulated hole concentration of the device in FIG. 4C at 1.2 V reverse bias, showing that holes in the right side of the waveguide are depleted, effectively creating the thin intrinsic region. FIG. 5D shows the simulated hole concentration of the device in FIG. 4C at 5.0 V reverse bias. It can be seen from FIG. 5D that at this bias, holes at the center of the waveguide are mostly depleted.

Figure 6A:
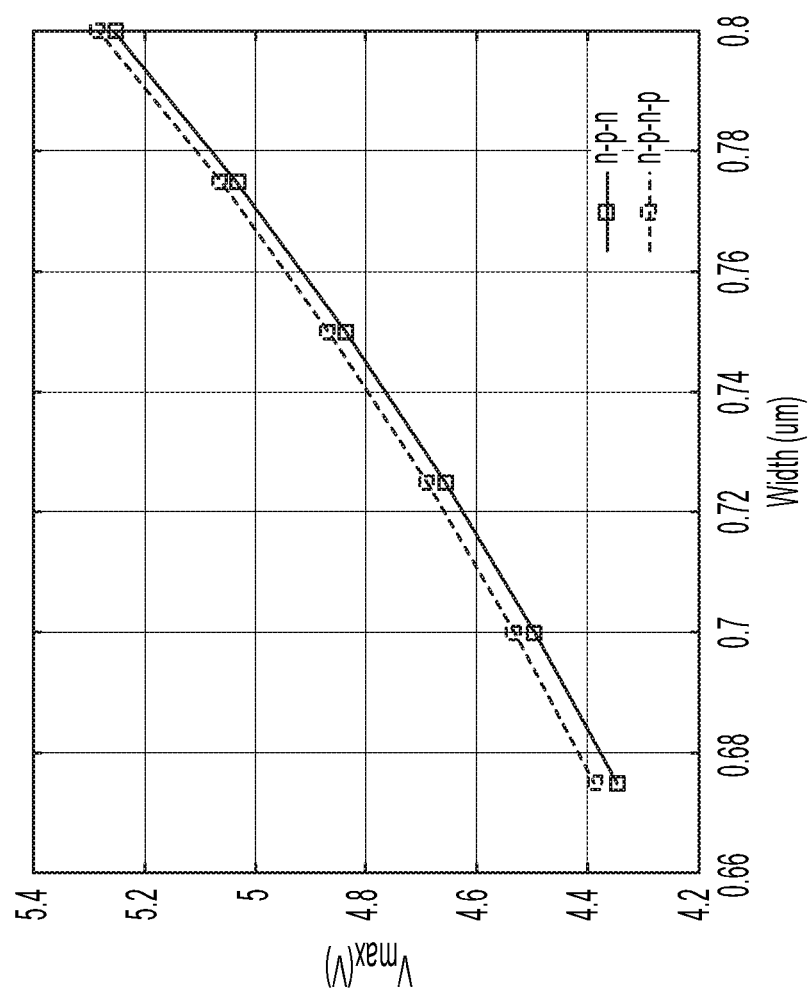
FIG. 6A is a graph of simulated modulator characteristics, according to an embodiment of the present disclosure.
Figure 6B:
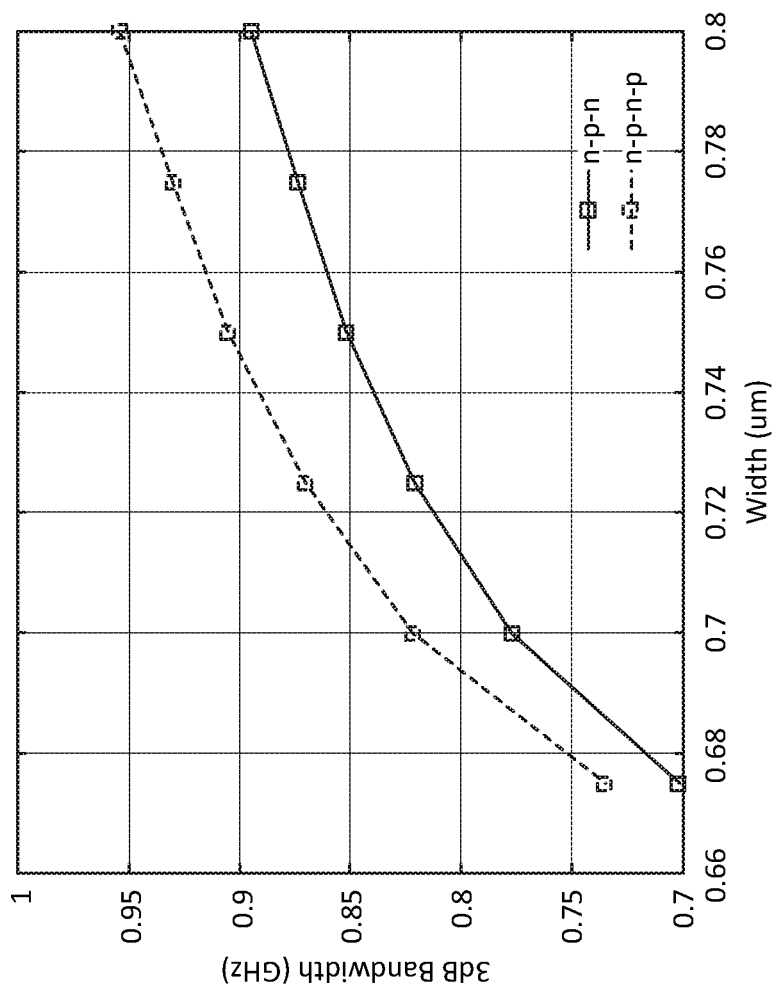
FIG. 6B is a graph of simulated modulator characteristics, according to an embodiment of the present disclosure.

FIGS. 6A-6D show graphs of simulated device performance versus waveguide width, for a device such as that of FIG. 4C, for two cases, (i) without (n-p-n) and (ii) with (n-p-n-p) secondary P doping (forming a secondary P region 170). In the example to which FIGS. 6A-6D apply, the length of the simulated device is 2.5 mm. FIG. 6A shows Vmax as a function of waveguide width. Vmax is defined such that 0.75 pi phase shift is achieved between V=1.2 V and Vmax. The difference in Vmax is less than 1% between the two cases. FIG. 6B shows the average 3 dB bandwidth as a function of waveguide width when the phase modulator is modulated between V=1.2 V and Vmax. The 3 dB bandwidth takes into account an output impedance of 9 ohms in the driver connected to the phase modulator.

Figure 6C:
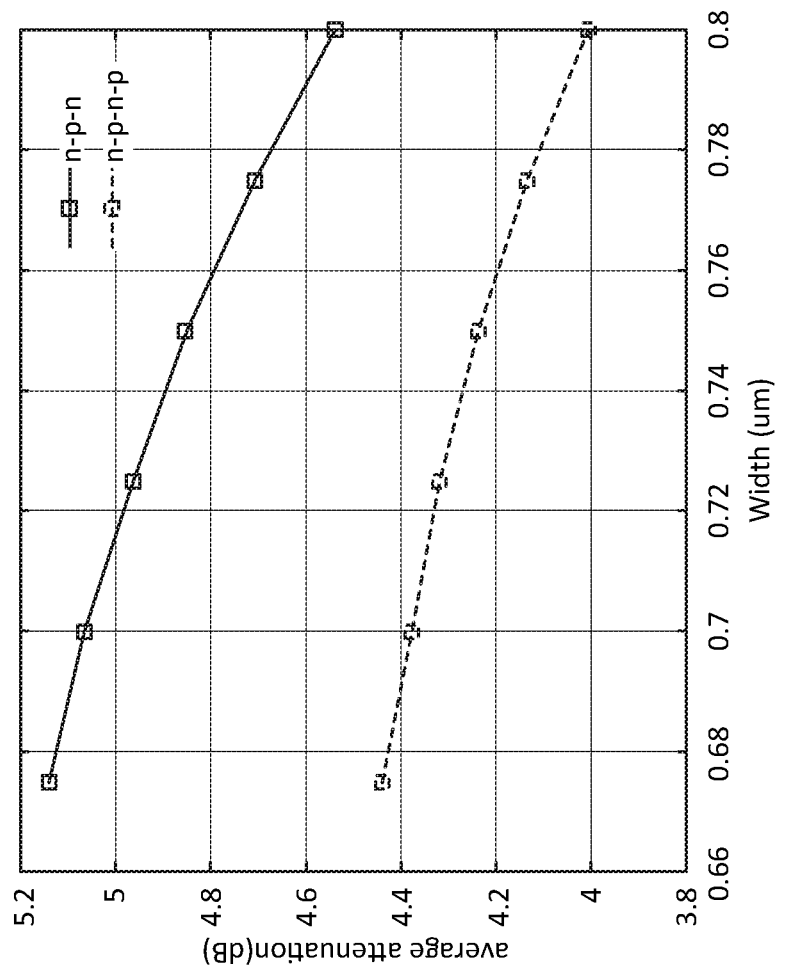
FIG. 6C is a graph of simulated modulator characteristics, according to an embodiment of the present disclosure.
Figure 6D:
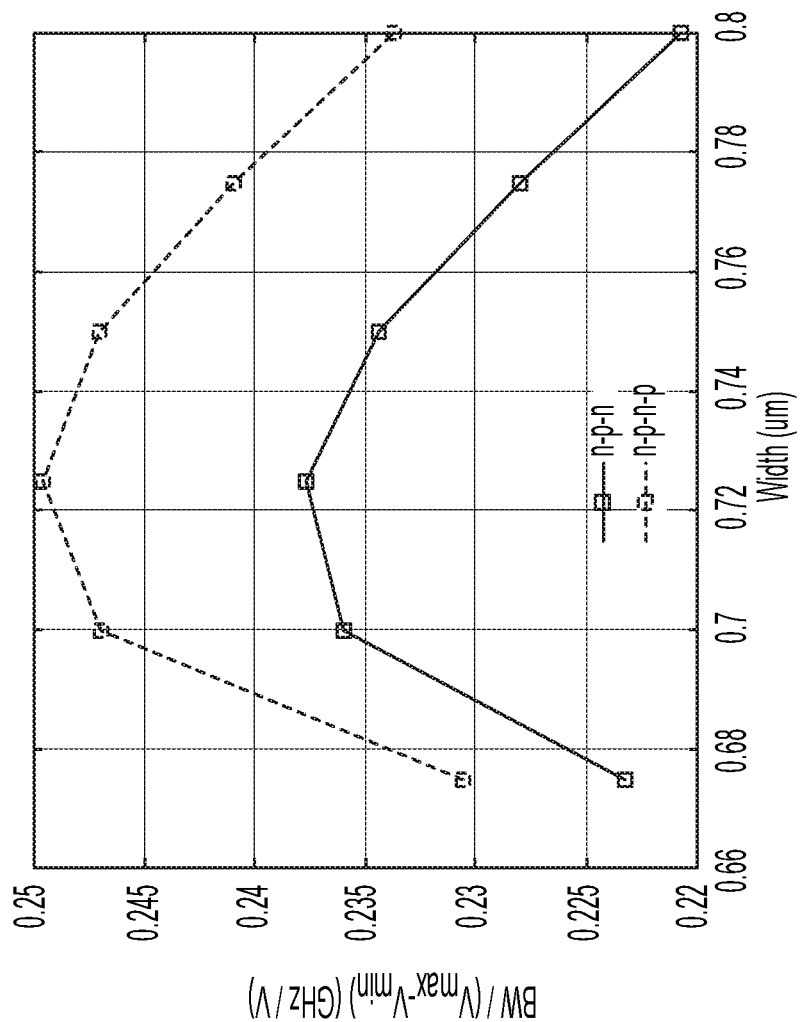
FIG. 6D is a graph of simulated modulator characteristics, according to an embodiment of the present disclosure.

FIG. 6C shows the average attenuation as a function of waveguide width when the phase modulator is modulated between V=1.2 V and Vmax. It may be seen from FIG. 6C that when secondary P doping is used, a reduction in the average attenuation of the phase modulator may be achieved, due to the decreased N concentration in the waveguide. For example, at a waveguide width of 675 nm, the presence of a secondary P region 170 lowers the average attenuation by 0.7 dB. FIG. 6D shows a figure of merit as a function of waveguide width when the phase modulator is modulated between V=1.2 V and Vmax. For FIG. 6D, the figure of merit is defined as the average 3 dB bandwidth divided by (Vmax−1.2 V).

Figure 7A:
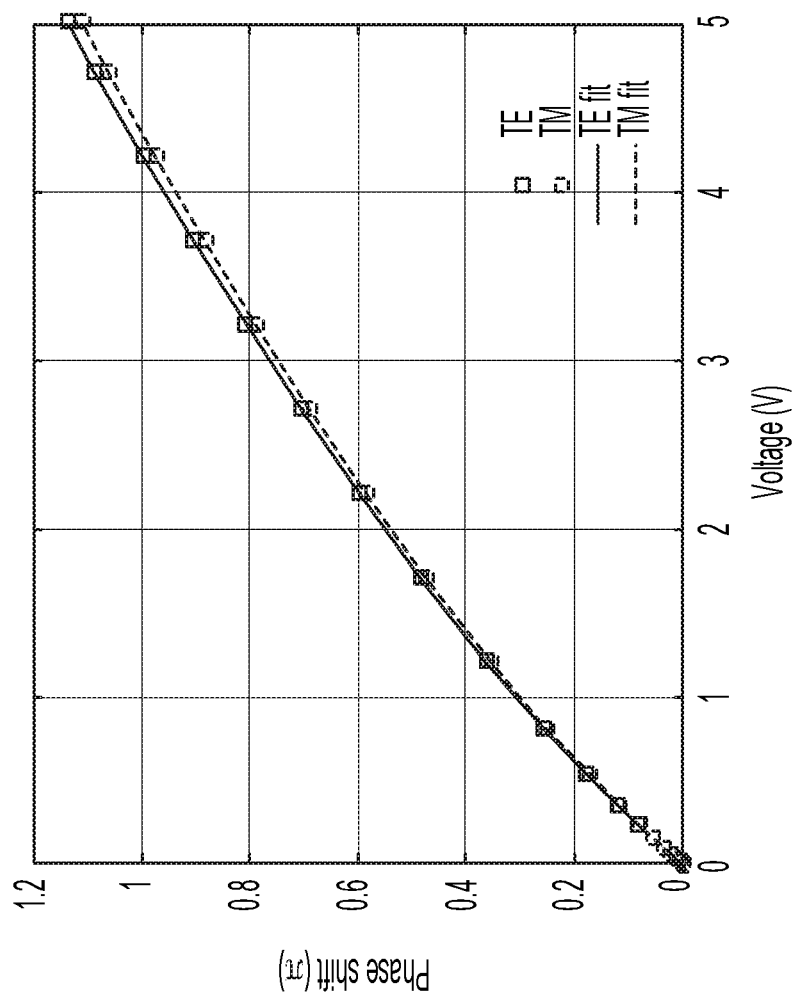
FIG. 7A is a graph of simulated modulator characteristics, according to an embodiment of the present disclosure.
Figure 7B:
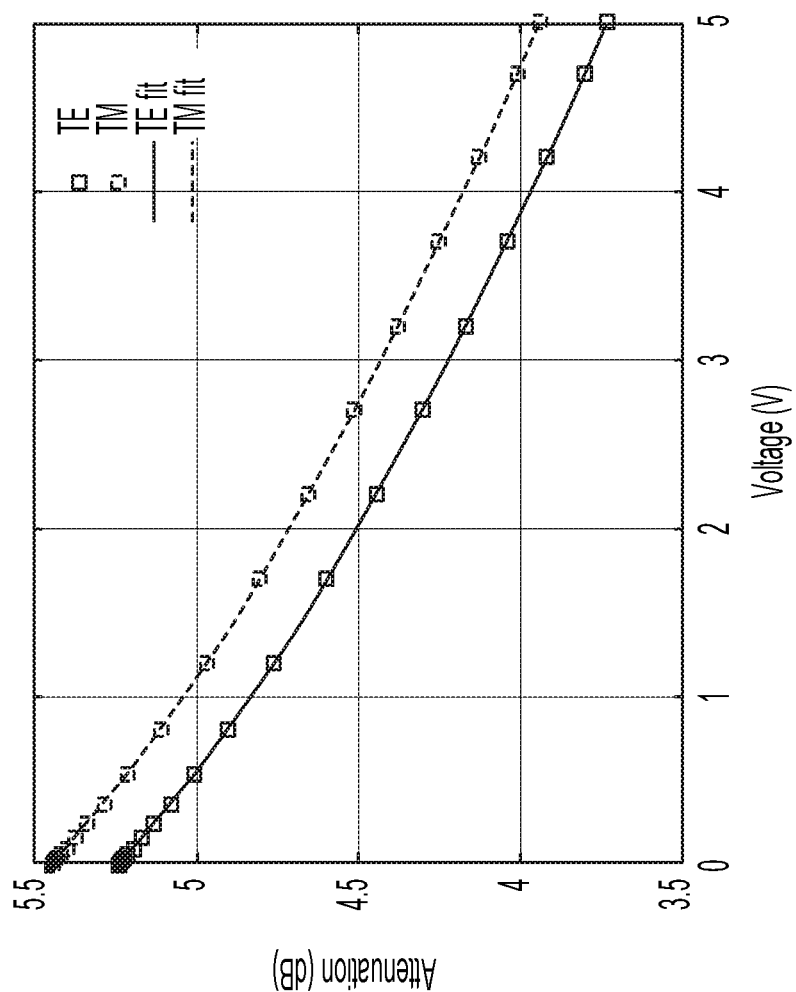
FIG. 7B is a graph of simulated modulator characteristics, according to an embodiment of the present disclosure.

In some embodiments, a pn junction phase modulator may be nearly polarization-independent in the sense that it has very small polarization-dependent phase change and absorption. FIG. 7A shows the simulated phase shift as a function of reverse bias voltage for the fundamental TE and TM modes of a modulator according to the embodiment of FIG. 4C, with a length of 2.5 mm, and a waveguide width of 0.75 microns. In this example, the device has secondary P doping (forming a secondary P region 170). The simulation used to generate FIG. 7A shows that $V\pi=4.24$ V for the TE mode, and $V\pi=4.36$ V for the TM mode; the difference between these two values is 2.8%. For the fundamental TE mode, $V\pi L=1.06$ V cm. FIG. 7B show attenuation as a function of reverse bias voltage for the fundamental TE and TM modes of a modulator according to the embodiment of FIG. 4C, with a length of 2.5 mm, and a waveguide width of 0.75 microns. The attenuation may be attributed to free carrier absorption.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a pn-junction phase modulator in a large silicon waveguide platform have been specifically described and illustrated herein, many modifications and variations will be apparent to those skilled in the art. Accordingly, it is to be understood that a pn-junction phase modulator in a large silicon waveguide platform constructed according to principles of this disclosure may be embodied other than as specifically described herein. The invention is also defined in the following claims, and equivalents thereof.

What is claimed is:

1. A modulator, comprising:
a portion of an optical waveguide, the optical waveguide comprising a rib extending upwards from a surrounding slab;
the rib having a first sidewall, and a second sidewall parallel to the first sidewall;
the rib including a first region of a first conductivity type, a second region of a second conductivity type different from the first conductivity type, and a third region of the first conductivity type;
the second region having:
a first portion parallel to and extending to the first sidewall, and
a second portion parallel to the second sidewall,
the third region having:
a first portion being parallel to and extending to the second sidewall and extending to a top surface of the rib, and
a second portion being parallel to and extending to the top surface of the rib and along the top surface of the rib, the second portion covering a part of the second region;
the first region extending between the first portion of the second region and the second portion of the second region; and
the second portion of the second region being between the first region and the third region, wherein:
the first region is formed by ion implantation with an implantation energy sufficient for the ions to reach the center of the rib;
the second region is formed by ion implantation with an implantation energy not sufficient for the ions to reach the center of the rib; and
the third region is formed by ion implantation with an implantation energy less than that of the ion implantation used to form the second region.

2. The modulator of claim 1, wherein the ratio of the height of the rib to the width of the rib is greater than 2 and less than 6,
wherein the second region covers a top part of the first region, and
wherein the second portion of the third region covers the top part of the first region.

3. The modulator of claim 1, wherein the first region has a keyhole shape including a rounded upper portion having a width exceeding, by at least 5%, a width of a narrower lower portion.

4. The modulator of claim 1, wherein an interface between the first region and the second region includes two parallel vertical portions, the modulator being configured to impose a phase shift on light propagating through it, in response to a reverse-bias voltage applied being applied across the first region and the second region, at least 90% of the phase shift being due to interaction of the light with the two parallel vertical portions.

5. The modulator of claim 1, further comprising:
a first metal contact, and
a second metal contact,
the first metal contact being connected to the first region through a conductive path traversing, in a direction from the first metal contact to the first region:
first, a heavily doped region of the first conductivity type, and
second, a doped region of the first conductivity type, with a doping level between that of the heavily doped region of the first conductivity type and that of the first region; and
the second metal contact being connected to the second region through a conductive path traversing, in a direction from the second metal contact to the second region:
first, a heavily doped region of the second conductivity type, and
second, a doped region of the second conductivity type, with a doping level between that of the heavily doped region of the second conductivity type and that of the second region.

6. The modulator of claim 5, further comprising a trench between the first metal contact and the rib.

7. The modulator of claim 6, wherein:
a first portion of the first metal contact is in direct contact with the heavily doped region of the first conductivity type, and
a second portion of the of the first metal contact is directly on a layer of silicon dioxide, the layer of silicon dioxide being directly on the heavily doped region of the first conductivity type.

8. The modulator of claim 1, wherein the first conductivity type is p-type and the second conductivity type is n-type.

9. The modulator of claim 1, wherein the rib has a height of at least 1.8 microns and less than 4 microns and a width of at least 0.5 microns and less than 1.5 microns.

10. The modulator of claim 1, wherein the rib is composed of crystalline silicon or of crystalline silicon germanium, and
wherein the second portion of the third region extends from the first portion of the third region toward the first sidewall,
the first, second, and fifth ion implantation operations implant dopants of a first conductivity type, and
the fifth ion implantation operation is performed at a lower implantation energy than the first ion implantation operation.

11. A modulator, comprising:
a portion of an optical waveguide, the optical waveguide comprising a rib extending upwards from a surrounding slab;
the rib having a first sidewall, and a second sidewall parallel to the first sidewall;
the rib including a first region of a first conductivity type, a second region of a second conductivity type different from the first conductivity type, and a third region having a lower carrier density than the first region;
the second region having:
a first portion parallel to and extending to the first sidewall, and
a second portion parallel to the second sidewall,
the third region having a first portion being parallel to and extending to the second sidewall, a bottom surface of the first portion of the third region being in direct contact with the first region;
the first region extending between the first portion of the second region and the second portion of the second region; and
the second portion of the second region being between the first region and the third region,
wherein:
the first region is formed by ion implantation with an implantation energy sufficient for the ions to reach the center of the rib;
the second region is formed by ion implantation with an implantation energy not sufficient for the ions to reach the center of the rib; and
the third region is formed by ion implantation with an implantation energy less than that of the ion implantation used to form the second region.

12. The modulator of claim 11, wherein the third region is an intrinsic region.

* * * * *